United States Patent
Abbott et al.

(10) Patent No.: US 12,249,163 B2
(45) Date of Patent: Mar. 11, 2025

(54) LANE MASK GENERATION FOR AUTONOMOUS MACHINE

(71) Applicant: NVIDIA Corporation, Santa Clara, CA (US)

(72) Inventors: Josh Abbott, Draper, UT (US); Miguel Sainz Serra, Palo Alto, CA (US); Zhaoting Ye, Santa Clara, CA (US); David Nister, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 770 days.

(21) Appl. No.: 17/234,487

(22) Filed: Apr. 19, 2021

(65) Prior Publication Data
US 2021/0241005 A1  Aug. 5, 2021

Related U.S. Application Data

(63) Continuation of application No. 16/535,440, filed on Aug. 8, 2019, now Pat. No. 10,997,435.

(51) Int. Cl.
*G06K 9/00* (2022.01)
*G06T 7/12* (2017.01)
(Continued)

(52) U.S. Cl.
CPC .............. *G06V 20/588* (2022.01); *G06T 7/12* (2017.01); *G06T 7/70* (2017.01); *G06T 11/20* (2013.01);
(Continued)

(58) Field of Classification Search
CPC ........... G06V 20/588; G06T 7/12; G06T 7/70; G06T 11/20; G06T 2207/20084;
(Continued)

(56) References Cited

U.S. PATENT DOCUMENTS 9,098,751 B2  8/2015  Hilldore et al.
9,721,471 B2  8/2017  Chen et al.
(Continued)

FOREIGN PATENT DOCUMENTS

CN  107563256 A  1/2018
CN  110009705 A  7/2019
(Continued)

OTHER PUBLICATIONS

Abe, Sadayuki, et al. "Lane marking detection by extracting white regions with predefined width from bird's-eye road images." Intelligent Robots and Computer Vision XXVIII: Algorithms and Techniques. vol. 7878. SPIE, 2011. (Year: 2011).*
(Continued)

*Primary Examiner* — Jonathan S Lee
(74) *Attorney, Agent, or Firm* — Taylor English Duma L.L.P.

(57) ABSTRACT

In various examples, object fence corresponding to objects detected by an ego-vehicle may be used to determine overlap of the object fences with lanes on a driving surface. A lane mask may be generated corresponding to the lanes on the driving surface, and the object fences may be compared to the lanes of the lane mask to determine the overlap. Where an object fence is located in more than one lane, a boundary scoring approach may be used to determine a ratio of overlap of the boundary fence, and thus the object, with each of the lanes. The overlap with one or more lanes for each object may be used to determine lane assignments for the objects, and the lane assignments may be used by the ego-vehicle to determine a path or trajectory along the driving surface.

20 Claims, 21 Drawing Sheets

(51) Int. Cl.
   *G06T 7/70* (2017.01)
   *G06T 11/20* (2006.01)
   *G06V 20/56* (2022.01)
(52) U.S. Cl.
   CPC .............. *G06T 2207/20084* (2013.01); *G06T 2207/20132* (2013.01); *G06T 2207/30256* (2013.01); *G06T 2210/12* (2013.01)
(58) Field of Classification Search
   CPC . G06T 2207/20132; G06T 2207/30256; G06T 2210/12
   USPC ........................................................ 382/103
   See application file for complete search history.

(56) References Cited

U.S. PATENT DOCUMENTS

| | | | |
|---|---|---|---|
| 10,262,213 | B2 | 4/2019 | Chen et al. |
| 10,313,638 | B1 | 6/2019 | Yeturu et al. |
| 10,586,456 | B2 | 3/2020 | Wang |
| 10,761,535 | B2 | 9/2020 | Chen et al. |
| 10,832,439 | B1 | 11/2020 | Ma et al. |
| 10,885,698 | B2 | 1/2021 | Muthler et al. |
| 10,997,433 | B2 | 5/2021 | Xu et al. |
| 12,131,566 | B2 | 10/2024 | Abbott et al. |
| 2018/0075481 | A1 | 3/2018 | Adoni et al. |
| 2018/0300964 | A1 | 10/2018 | Lakshamanan et al. |
| 2019/0016331 | A1 | 1/2019 | Carlson et al. |
| 2019/0147600 | A1 | 5/2019 | Karasev et al. |
| 2019/0156128 | A1 | 5/2019 | Zhang et al. |
| 2019/0286153 | A1 | 9/2019 | Rankawat et al. |
| 2020/0293064 | A1 | 9/2020 | Wu et al. |
| 2023/0027622 | A1* | 1/2023 | Haeusler ................. G01S 7/497 |
| 2024/0362928 | A1 | 10/2024 | Abbott et al. |
| 2024/0362929 | A1 | 10/2024 | Abbott et al. |

FOREIGN PATENT DOCUMENTS

| | | |
|---|---|---|
| CN | 109429518 A | 10/2022 |
| JP | 11153406 A | 6/1999 |
| JP | 2018523877 A | 8/2018 |
| JP | 7424866 B2 | 1/2024 |
| WO | 2015096911 A1 | 7/2015 |
| WO | 2018216177 A1 | 11/2018 |
| WO | 2019094843 A1 | 5/2019 |

OTHER PUBLICATIONS

Chen, Ping-Rong, et al. "Efficient road lane marking detection with deep learning." 2018 IEEE 23rd International Conference on Digital Signal Processing (DSP). IEEE, 2018. (Year: 2018).*

Roberts, Brook, et al. "A dataset for lane instance segmentation in urban environments." Proceedings of the European Conference on Computer Vision (ECCV). 2018. (Year: 2018).*

Mathibela, Bonolo, Paul Newman, and Ingmar Posner. "Reading the road: Road marking classification and interpretation." IEEE Transactions on Intelligent Transportation Systems 16.4 (2015): 2072-2081. (Year: 2015).*

Wang, Guiling, Jinlong Meng, and Yanbo Han. "Extraction of maritime road networks from large-scale AIS data." IEEE Access 7 ( 2019): 123035-123048. (Year: 2019).*

"Taxonomy and Definitions for Terms Related to Driving Automation Systems for On-Road Motor Vehicles", Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", Society of Automotive Engineers (SAE), Standard No. J3016-201806, pp. 1-35 (Jun. 15, 2018).

Kunze, L., et al., "Reading between the lanes: Road layout reconstruction from partially segmented scenes", 21st International Conference on Intelligent Transportation Systems (ITSC) , IEEE, pp. 401-408 (Nov. 2018).

Wu, J., et al., "Automatic background filtering and lane identification with roadside LiDAR data", IEEE 20th International Conference on Intelligent Transportation Systems (ITSC), pp. 1-6 (2017).

Abbott, Josh; Non-Final Office Action for U.S. Appl. No. 17/234,475, filed Apr. 19, 2021, mailed Dec. 7, 2023, 18 pgs.

Behrendt; "Boxy Vehicle Detection in Large Images," Proceedings of the IEEE/CVF International conference on computer vision workshops, 2019, 7 pgs.

Roberts, et al.; "A Dataset for Lane Instance Segmentation in Urban Environments," Proceedings of the European Conference on Computer Vision (ECCV), 2018, 17 pgs.

Abbott, Josh; Final Office Action for U.S. Appl. No. 17/234,475, filed Apr. 19, 2021, mailed Apr. 22, 2024, 21 pgs.

Xie, et al.; "Semantic Instance Annotation of Street Scenes by 3D and 2D Label Transfer," 216 IEEE Conference on Computer Vision and Pattern Recognition, 2016, 10 pgs.

Neven, D., et al., "Towards end-to-end lane detection: an instance segmentation approach", In 2018 IEEE intelligent vehicles symposium (IV), pp. 7 (2018).

Nister, David; First Office Action for German Patent Application No. 10 2020 117 792.5, filed Jul. 6, 2020, mailed Apr. 4, 2024, 12 pgs.

Riera, et al.; "Driver Behavior Analysis Using Lane Departure Detection Under Challenging Conditions," arXiv: 1906.00093; May 31, 2019, 6 pgs.

Bansal, Mayank; "Vision-based Perception for Autonomous Urban Navigation," 11th International IEEE Conference on Intelligent Transportation System, Oct. 2008, 7 pgs.

Abbott, Josh; Notice of Allowance for U.S. Appl. No. 17/234,475, filed Apr. 19, 2021, mailed Jul. 1, 2024, 18 pgs.

Ross, "Catadioptric Mobile Robot Image Mosaicing for Vehicle Undercarriages," Diss. La Trobe, 2012, 154 pgs.

Goberville, et al.; "Tire Track Identification: A Method for Drivable Region Detection in Conditions of Snow-Occluded Lane Lines," SAE International Journal of Advances and Current Practices in Mobility (2022) 8 pgs.

Nister, David; First Office Action for Japanese Patent Application No. 2020-036424, filed Mar. 4, 2020, mailed Oct. 11, 2023, 5 pgs.

Abbott, Josh; First Office Action for Chinese Patent Application No. 202010350455.1, filed Apr. 28, 2020, mailed Aug. 20, 2024, 9 pgs.

\* cited by examiner

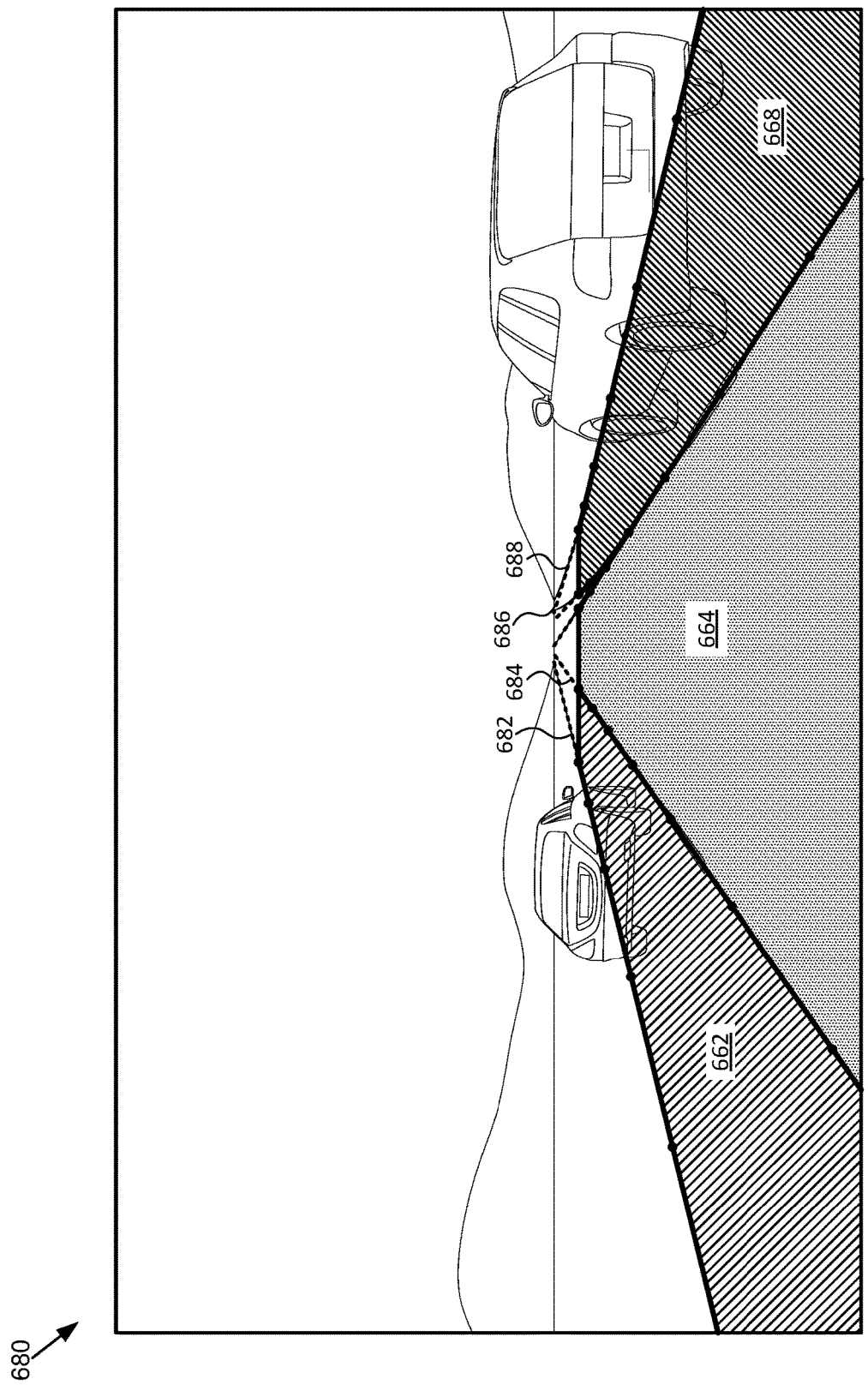

LANE MASK GENERATION FOR AUTONOMOUS MACHINE

RELATED APPLICATIONS

This application is a continuation of U.S. patent application Ser. No. 16/535,440, titled "LEVERAGING OBSTACLE AND LANE DETECTIONS TO DETERMINE LANE ASSIGNMENTS FOR OBJECTS IN AN ENVIRONMENT," filed Aug. 8, 2019, which is incorporated herein by reference in its entirety.

BACKGROUND

Autonomous driving systems and advanced driver assistance systems (ADAS) may leverage sensors, such as cameras, to perform various tasks—such as lane keeping, lane changing, lane assignment, camera calibration, and localization. For example, for autonomous and ADAS systems to operate independently and efficiently, an understanding of the surrounding environment of the vehicle—in real-time or near real-time—may be generated. This understanding may include information as to locations of objects and/or obstacles in the environment with respect to various demarcations—such as lanes, road boundaries, intersections, and/or the like. The information of the surrounding environment may be used by a vehicle when making decisions, such as what path or trajectory to follow, whether to speed up or slow down, whether a lane change or other maneuver is currently safe, etc.

In conventional systems, lane (or other location) assignments for objects (e.g., vehicles, pedestrians, etc.) may be interpolated from real-time images processed using various computer vision or machine learning techniques (e.g., from visual indicators identified via image processing). For example, images captured of a driving surface including lanes and vehicles may be analyzed to determine correlations between the vehicles and the lanes. However, because an entire vehicle's interactions with lanes may be used, the actual lanes of travel of the vehicle may be inaccurately identified in conventional systems. For example, in image space, and dependent on the perspective of the camera, a vehicle may appear to extend into an adjacent lane (e.g., when a camera has a perspective of a vehicle to its left, the top of the vehicle may appear to extend into left adjacent lanes of the vehicle) even when the vehicle is actually in a single lane. This may not provide the most accurate results for use by the autonomous and/or ADAS systems when attempting to understand the surrounding environment— thereby decreasing the overall effectiveness and reliability of this environmental information.

SUMMARY

Embodiments of the present disclosure relate to leveraging obstacle and lane detections to determine lane assignments for objects in an environment. Systems and methods are disclosed that provide for leveraging object detections, freespace detections, object fence detections, and/or lane detections to efficiently and accurately assign objects to respective lanes or other defined portions of an environment. In contrast to conventional approaches, such as those described above, the current system provides techniques to detect and assign objects to lanes using outputs from multiple sensors (e.g., cameras, RADAR sensors, LIDAR sensors, etc.) of a vehicle in real-time or near real-time. Embodiments of the present disclosure may combine outputs of various computer vision or machine learning algorithms for path detection, lane detection, and/or object or obstacle detection to assign objects to lanes in a vehicle's surroundings. For example, the current system may learn to detect pixels and corresponding lanes, in image space, occupied by an object(s) using sensor data from any number of sensors. The pixel occupancy of an object may be determined using an object fence, or region, corresponding to a portion of the object actually occupying a lane. For example, a footprint of the object may be determined such that only the footprint is used in determining the space occupied by the object. By more accurately identifying the object fence, or footprint, of the object, the process of determining lane assignments may be comparatively less computationally expensive because a reduced number of pixels (e.g., pixels of the object fence, and not the entire vehicle) may be analyzed to determine lane assignments. In return, the reduction in computational expense may reduce the burden of determining lane assignments for objects, thereby freeing up processing power for other advanced driver assistance systems (ADAS) or autonomous tasks while simultaneously reducing run-time.

BRIEF DESCRIPTION OF THE DRAWINGS

The present systems and methods for leveraging obstacle and lane detections to determine lane assignments for objects in an environment is described in detail below with reference to the attached drawing figures, wherein:

FIG. 6E is an illustration of lane extension performed on a lane mask to extend lanes, in accordance with some embodiments of the present disclosure;

DETAILED DESCRIPTION

Figure 1:
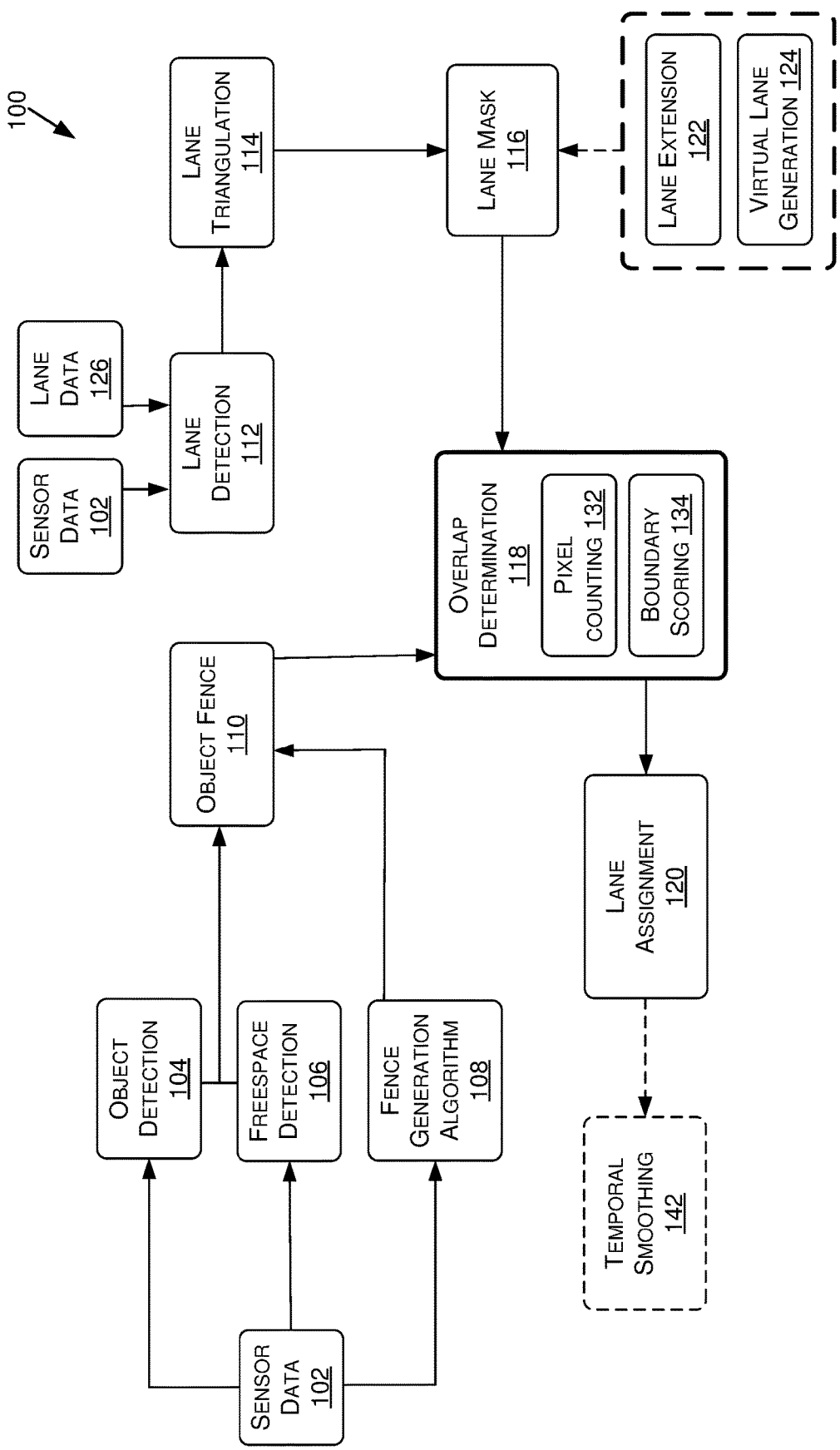
FIG. 1 is an example data flow diagram illustrating an example process for determining lane assignments for objects in an environment, in accordance with some embodiments of the present disclosure.

Systems and methods are disclosed related to leveraging obstacle and lane detections to determine lane assignments for objects in an environment. The systems and methods described herein may be used in augmented reality, virtual reality, robotics, security and surveillance, medical imaging, autonomous machine applications, and/or any other technology spaces where object detection and assignment may be implemented. Although the present disclosure may be described with respect to an example autonomous vehicle 900 (alternatively referred to herein as "vehicle 900" or "autonomous vehicle 900," an example of which is described with respect to FIGS. 9A-9D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the detections described herein relate primarily to objects such as vehicles and/or pedestrians, the present disclosure is not intended to be limited to only these detections. For non-limiting examples, the processes described herein may be used for detecting any objects or features, such as, without limitation, road signs, aircraft, boats, shuttles, bicycles, motorcycles, traffic lights, baggage, signs, poles, animals, trees, characters, letters, items, products, barriers, digital watermarks, and/or anatomical objects.

As described above, in contrast to conventional systems, the current system provides accurate and computationally efficient approaches to detect and assign objects to lanes using outputs from multiple sensors (e.g., camera, LIDAR sensors, RADAR sensors, SONAR sensors, etc.) of a vehicle in real-time or near real-time. For example, prior to lane assignment, object fences or footprints may be determined. In some embodiments, the object fence may be determined using a combination of inputs. For example, an object detection input may be generated using a machine learning model (e.g., a convolutional neural network (CNN) trained to detect objects) and/or a computer vision object detection algorithm. The object detection input may include a bounding shape, such as a box, that corresponds to an object. In some examples, at least a portion of the bounding shape may be cropped, such as to reduce the bounding shape to a bottom fifth of the shape, in a non-limiting example. Another input may include a drivable freespace input that may be similarly generated using a machine learning model and/or a computer vision algorithm. The drivable freespace input may be used to crop (or further crop) or carve out a portion of the bounding shape that corresponds to drivable freespace. As a result, the remaining portion of the bounding shape (e.g., the bounding shape with the carved out drivable freespace) may be referred to as the object fence or footprint within two-dimensional (2D) image space. This process may be performed for each object in the field of view or sensory field of the sensors of an ego-vehicle. Using this method, false positive lane assignments may be decreased as a top or upper portion of an object may be unlikely to actually intersect with a lane in world space (although it may appear to intersect a lane in image space, a drawback of conventional approaches).

In some examples, the object fence may be generated using a fence detection algorithm specifically programmed (or trained, in an example where the algorithm is a machine learning model) to detect and objects and generate fences for the objects. For example, sensor data from any number of sensors (e.g., cameras, RADAR sensors, LIDAR sensors, SONAR sensors, etc.) may be used as inputs to a fence detection algorithm, and the fence detection algorithm may generate the object fence in world space (e.g., three-dimensional world space). The object fence may be converted from three-dimensional (3D) world space to 2D image space using intrinsic and/or extrinsic parameters of the sensors that generated the sensor data.

In some embodiments, future locations of objects in the environment may be determined using sensor data (e.g., LIDAR data, SONAR data, image data, RADAR data, etc.) in addition to the object fence. For example, once an object fence is determined, the sensor data may be used to determine a path or trajectory of the objects in the environment to determine one or more future locations (e.g., 0.5 seconds in the future, 1 second in the future, etc.), and the object fence may be applied at the future locations. As such, using a current location of objects and velocity and/or acceleration data corresponding to the objects, one or more algorithms and/or machine learning models may be used to determine future locations of the objects and thus locations of corresponding object fences for the objects at the future locations. In some examples, a scaling factor may be used as the future location of the objects change with respect to the location of the vehicle (e.g., as an object moves further away, the object fence may be decreased from a current size, as an object moves closer as a result of slowing down, for example, the object fence may be increased in size, and so on). This information may then be used to inform the vehicle of lanes or other portions of the environment where the objects may be located at a future time to aid in trajectory or path planning, obstacle avoidance, and/or other operations of the vehicle.

The object fence may then be used in combination with lane data to determine the overlap of the object fence with the lanes in the environment (e.g., the driving surface)—thus determining the lane(s) associated with each object. The lane data may be received in the form of a lane graph(s) and/or maps (e.g., navigation-level maps, high definition (HD) maps, and/or the like). The lane data may be used to generate a lane mask representing the pixels in 2D image space that correspond to each lane. In some examples, the lane graphs, the maps, and/or a combination thereof may be used to determine the number and location of lanes in the environment. For example, a lane mask algorithm may be used that receives the lane data as input and may generate the lane masks. In embodiments, the lanes may be defined by polylines (e.g., including points along lines demarcating the lanes). As such, to generate a mask from the polylines, a triangulation method may be used in some embodiments. The triangulation method may connect points along the polylines (e.g., every other point, in a crisscross fashion from one polyline to the other polyline, for each lane). As a non-limiting example, the triangulation method may include monotone polygon triangulation. The result of the triangulation may include polygons in 2D image space, each corresponding to a lane, such that each pixel within a polygon for a given lane is determined to correspond to that lane.

In some examples, a full or useable extent of lanes may not be determined during lane mask generation. In such examples, the lanes may be extended using a lane extension algorithm (e.g., curve fitting, lane extrapolation, etc.). By extending the lanes, false positives may be reduced. In other examples, there may be no lane detection data for use by the system. In such examples, virtual lanes may be generated. For example, at least three lanes may be generated in some embodiments, including the ego-lane (e.g., a lane of the ego-vehicle) and an adjacent lane on either side. By generating virtual lanes, even if not entirely accurate, objects may be assigned to virtual lanes to provide a better understanding to the ego-vehicle of locations of objects relative to a path (e.g., an ego lane) of the ego-vehicle.

Once the object fences and the lane mask are determined, the objects may be associated with the lanes by determining overlap between the pixels of the object fence and the lane mask in 2D image space. The object may be assigned to a lane(s) in the lane mask based on an overlap of pixels in the object fence with lane pixels in the lane mask. In some examples, each object may be assigned to a lane(s) based on a simple pixel count. In other examples, the object fence may be represented by vertices (or pixels corresponding thereto) along a perimeter of the object fence. Where an object is in a single lane, the pixel distances between each set of two perimeter pixels may be calculated, added up, and normalized to create a ratio of intersection per lane, which would be 1/1 for a single lane. Where an object is in more than one lane, a set of points that crosses the lane boundary may be determined. Once the two pixels are determined, a new vertex may be generated at the crossing between the two pixels. This pixel may then be used to determine the distance between the new vertex and each other perimeter pixel or vertex on either side of the crossing. A first sum of distances between the new vertex and a first set of perimeter pixels for a first lane may be calculated and a second sum of distances between the new vertex and a second set of perimeter pixels for a second lane may be calculated. These sums may then be normalized, in some embodiments. Ultimately, a ratio of intersection per lane may be determined using the first sum and the second sum. Knowing the ratio of intersection, and how the ratio changes from frame to frame, may provide an indication of the trajectory of the object (e.g., switching lanes, swerving, lane keeping, etc.).

In some embodiments, temporal smoothing may be used to leverage prior lane assignments for previous frames for an object. For example, because lane assignments may be more accurate as an object is closer to a vehicle, as the vehicle is moving further away, the prior lane assignments may be leveraged to provide more accurate predictions of the object lane assignment at further distances, where lanes tend to appear to merge in 2D image space.

Ultimately, data representing the lane assignments for objects may then be compiled and sent to a perception layer, a world model management layer, a planning layer, a control layer, and/or another layer of an autonomous driving software stack to aid an autonomous vehicle and/or an ADAS capable vehicle in navigating the driving surface safely and effectively.

With reference to FIG. 1, FIG. 1 is an example data flow diagram illustrating an example process 100 for determining lane assignments for objects in an environment, in accordance with some embodiments of the present disclosure. While the detection types described with respect to FIG. 1 are lane detections, this is not intended to be limiting, and is for example purposes only. For example, the process 100 may be used to detect paths, trails, rows, lines, and/or other portions of an environment and to assign objects thereto, without departing from the scope of the present disclosure.

The process 100 may include generating and/or receiving sensor data 102 from one or more sensors of the vehicle 900. The sensor data 102 may be used by the vehicle 900, and within the process 100, to assign objects to lanes or other defined regions of an environment in real-time or near real-time. The sensor data 102 may include, without limitation, sensor data 102 from any of the sensors of the vehicle 900 (and/or other vehicles or objects, such as robotic devices, VR systems, AR systems, etc., in some examples). For example, and with reference to FIGS. 9A-9C, the sensor data 102 may include the data generated by, without limitation, global navigation satellite systems (GNSS) sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), and/or other sensor types.

In some examples, the sensor data 102 may include the sensor data generated by one or more forward-facing sensors, such as cameras (e.g., a center or near-center mounted camera(s)) and/or other sensor types (e.g., bumper-mounted RADAR sensors). This sensor data 102 may be useful for computer vision and/or perception when navigating—e.g., within a lane, through a lane change, through a turn, through an intersection, etc. —because a forward-facing camera may include a field of view (e.g., the field of view of the forward-facing stereo camera 968 and/or the wide-view camera 970 of FIG. 9B) that includes both a current lane of travel of the vehicle 900, adjacent lane(s) of travel of the vehicle 900, and/or boundaries of the driving surface. In some examples, in addition to forward-facing sensors, side-view sensors and/or rear-view sensors may be employed, such as where the lane assignments are to include objects to a side of the vehicle 900 and/or to the rear of the vehicle 900. In some examples, more than one camera or other sensor (e.g., a LIDAR sensor 964, a RADAR sensor 960, etc.) may be used to incorporate multiple fields of view (e.g., the fields of view of the long-range cameras 898, the forward-facing stereo camera 868, and/or the forward facing wide-view camera 870 of FIG. 8B) and/or sensory fields (e.g., of a LIDAR sensor 964, a RADAR sensor 960, etc.).

The sensor data 102 may include image data representing an image(s), image data representing a video (e.g., snapshots of video), and/or sensor data representing representations of sensory fields of sensors (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 may be used to generate an object fence 110 for one or more objects in an environment as captured by the sensors of the vehicle 900. The object fence 110 may be generated using any of a number of different methods, such as but not limited to those described herein. In some examples, the object fence 110 may be generated using a combination of freespace detection 106 and object detection 104, while in other examples the object fence 110 may be generated using a fence generation algorithm 108. In either examples, the object fence 110 may be used as an input for lane detection and assignment within the process 100.

In embodiments where object detection 104 and freespace detection 106 are used to generate the object fence 110, the sensor data 102 may be used as an input to both the object detection 104 and the freespace detection 106. For example, object detection 104 may use the sensor data 102 (e.g., image data from one or more cameras, LIDAR data from one or more LIDAR sensors, RADAR data from one or more RADAR sensors, etc.) to detect objects (e.g., vehicles, pedestrians, bicycles, debris, etc.) and generate bounding shapes (e.g., bounding boxes, circles, polygons, etc.) for the detected objects. Object detection 104 may use a machine learning model (e.g., a deep neural network (DNN), such as a convolutional neural network (CNN)), a computer vision algorithm, and/or another object detection algorithm type to detect the objects and generate the bounding shapes for the objects. Where a machine learning model is used for object detection 104, the machine learning model may include, without limitation, a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, convolutions, generative adversarial, liquid state machine, etc.), and/or other types of machine learning models.

The bounding shapes output using object detection 104 may represent portions of image(s) (represented by the sensor data 102) that correspond to objects (e.g., on a driving surface of the vehicle 900. For example, and with reference to visualization 200 of FIG. 2A, a bounding shape 204 may be generated for a vehicle 202—using object detection 104—to identify a portion of an image that corresponds to the vehicle 202. In a non-limiting example, the output of object detection 104 may include points (e.g., pixels) in the image(s) where objects are determined to be located. In such examples, the points may include each of the points or pixels within the bounding shape. As such, the bounding shape, in addition to an object mask generated within the bounding shape, may define each of the pixels corresponding to the object. This process may of object detection 104 may be carried out for any number of objects in each frame.

In some embodiments, to determine the object fence 110, at least a portion of the bounding shape for each detected object may be cropped. For example, because at least some of the object within the boundary shape may not correspond to a footprint of the object on the driving surface (e.g., in 2D image space, an upper portion of the vehicle 202 may extend beyond a lane of travel), at least a portion of the bounding shape may be cropped. As illustrated in visualization 220 of FIG. 2B, the bounding shape 204 may be cropped to generate a cropped bounding shape 222 corresponding to the vehicle 202. In some examples, a predefined portion, amount, or percentage of the bounding shape may be cropped, such as, without limitation, an upper half of the bounding shape, an upper three quarters, an upper four fifths, an upper two fourths and a bottom fourth, etc. By cropping at least a portion of the bounding shape, false negatives may be reduced as the resulting cropped bounding shape may more accurately correspond to a footprint of the vehicle 202 on the driving surface. In addition to the accuracy benefits with respect to an object footprint, cropping a portion of the bounding shape may also reduce the computational expense for determining the object fence 110 (e.g., by reducing the effective area for application of the freespace detection 106) and/or employing the object fence 110 for lane assignments (e.g., by reducing the number of pixels in the cropped out portion of the bounding shape that may be used in the calculation).

As described herein, outputs of free space detection 106 may be used in combination with the bounding shape and/or cropped bounding shape generated during object detection 104. For example, the sensor data 102 may be used by one or more computer vision algorithms, machine learning models, and/or other detection algorithms for drivable freespace to determine portions of an environment within a field(s) of view and/or sensor field(s) of sensors of the vehicle 900. The machine learning models that may be used for freespace detection 106 may include, but not be limited to, those described herein (e.g., with respect to object detection 104, above). As a non-limiting example, the drivable freespace may be determined using methods described in U.S. Non-Provisional application Ser. No. 16/355,328, filed on Mar. 15, 2019, and hereby incorporated by reference in its entirety.

The output of freespace detection 106 may represent portions of the environment—represented within images captured by camera(s) of the vehicle 900—that correspond to drivable freespace and/or non-drivable space on a driving surface. Drivable freespace may represent portions of the environment that are traversable or drivable by the vehicle 900 (e.g., a road may be drivable, while a sidewalk or building may not be drivable) as well as non-drivable space (e.g., a building, a park, etc.). Visualization 230 of FIG. 2C may represent at least a portion of the freespace detection 106 as applied to the cropped bounding shape 222. For example, the portion of drivable freespace 232 determined during freespace detection 106 may be cropped out of the cropped bounding shape 222 to generate object fence 110 (as represented in visualization 240 of FIG. 2D). As such, with respect to FIG. 2C, the object fence 110 may represent non-drivable space 234 within the cropped bounding shape 222—after the drivable freespace 232 is cropped out. In an example where the full bounding shape 204 is used, the drivable freespace within the full bounding shape 204 may be cropped out. In some examples, the freespace detection 106 may include points (e.g., pixels) in the image(s) where drivable freespace and/or non-drivable space are detected, and the cropping of the bounding shapes and/or the generation of the object fence 110 may be performed using the points. In such an example, the points corresponding to drivable freespace may be removed from the points corresponding to the bounding shape (or cropped version thereof) to generate the object fence 110. The cropping out process may be performed for each object detected in the input image(s) representing the field of view or sensory field of the sensors of vehicle 900.

In some embodiments, in addition to or instead of using object detection 104 and freespace detection 106, the object fence 110 may be generated using the fence generation algorithm 108. The fence generation algorithm 108 may include a machine learning model, a computer vision algorithm, and/or an object detection algorithm. Where a machine learning model is used, the machine learning model may include, but not be limited to, the machine learning models described herein (e.g., with respect to object detection 104, above). The fence generation algorithm 108 may be trained and/or programmed to use the sensor data 102 as input to detect objects and generate object fences 110 (e.g., as depicted in FIG. 2D) for each detected object. For example, sensor data 102 from any number of sensors (e.g., cameras, RADAR sensors 960, LIDAR sensors 964, ultrasonic sensors 962, etc.) may be used as inputs to the fence generation algorithm 108. The fence generation algorithm 108 may, in some embodiments, generate the object fence 110 in 2D or 3D world space, and intrinsic and/or extrinsic parameters of the corresponding sensors that generated the sensor data 102 may be used to convert the object fence 110 from world space to image space. For example, in order to accurately determine the relationship between world space coordinates and image coordinates, 3D to 2D projection may be used. For example, the sensors may be calibrated using one or more intrinsic (e.g., focal length, f, optical center ($u_o$, $v_o$), pixel aspect ratio, $\alpha$, skew, s, etc.) and/or extrinsic (e.g., 3D rotation, R, translation, t, etc.) camera parameters. In addition, in some non-limiting examples, one or more constraints may also be imposed, such as requiring that the 3D point always lies on the ground plane of the driving surface. In some examples, one or more of the parameters of the sensor(s) may be dynamic (e.g., due to vibration, movement, orientation, etc.), and the 3D to 2D projection may be dynamically updated as a result.

In some embodiments, the object fence(s) 110 may be generated as points (e.g., pixels and/or vertices) of a polygon corresponding to the object fence(s) 110. As such, by connecting the vertices, a polygon corresponding to the object fence(s) 110 may be generated, and the pixels within the object fence(s) 110 may be determined to correspond to the object for lane assignment. The object fence(s) 110 may be generated prior to lane assignment 120—using any method, such as those described herein—to improve accuracy and reliability of lane assignment predictions by more closely defining the shape or footprint of the object on a driving surface. For example, once the object fences 110 are determined, the object fences 110 may be used—in combination with the lane masks 116—to make an overlap determination 118 for lane assignment 120.

In some embodiments, future locations and/or assignments of objects in the environment may be determined using the sensor data 102 (e.g., LIDAR data, SONAR data, image data, RADAR data, etc.) and the object fence 110. For example, once the object fence 110 is determined, the sensor data 102—representative of speed, velocity, acceleration, yaw rate, etc.—may be used to determine a future path or trajectory of the objects in the environment to determine one or more future locations (e.g., 0.5 seconds in the future, 1 second in the future, etc.). For example, a linear dynamic model (e.g., future position=current position+(velocity×time)), a constant acceleration model, a constant turn-rate model, a machine learning model, another algorithm type, and/or a combination thereof may use the sensor data (or data represented thereby) to determine a future location(s) (e.g., in world space) of the object. Once the future location(s) are known, the object fence 110 may be generated (e.g., in image space) using the future location and the object fence 110 information. In some examples, a scaling factor may be used as the future location of the object changes with respect to the location of the vehicle 900 (e.g., as an object moves further away, the object fence 110 may be decreased from a current size, as an object moves closer as a result of slowing down, for example, the object fence 110 may be increased in size, and so on). This information may then be used to inform the vehicle 900 of lanes or other portions of the environment where the objects may be located at a future time to aid in trajectory or path planning, obstacle avoidance, and/or other operations of the vehicle. The determination of lane assignments 120 may be similar for future object fence locations as for current object fence locations, and the combination of current and future object fences 110 for a vehicle may provide a more detailed understanding of areas or volumes within the environment that the object is predicted to occupy over time (e.g., over the next second, two seconds, etc.).

Lane detection 112 may use the sensor data 102 and/or lane data 126 to determine locations of one or more lanes, divisions, splits, and/or boundaries of a driving surface. For example, lane detection 112 may use a computer vision algorithm, a machine learning model, and/or an object detection algorithm for determining the locations of lanes (or lane lines), divisions, splits, boundaries, and/or other regions of a driving surface. Where a machine learning model is used, the machine learning model may include, but not be limited to, the machine learning models described herein (e.g., with respect to object detection 104, above). As non-limiting examples, methods such as those described in U.S. Non-Provisional application Ser. No. 16/286,329, filed on Feb. 15, 2019, and U.S. Non-Provisional application Ser. No. 16/514,404, filed on Jul. 17, 2019, each of which is hereby incorporated by reference in its entirety.

In some examples, lane detection 112 may use lane data 226, where the lane data 226 may include lane graph(s) and/or map(s) (e.g., navigation-level maps, high definition (HD) maps). For example, the lane data 226 may be representative of a number of lanes on a driving surface and/or exit ramps, merges, divides, and/or other features in the environment. As such, lane detection 112 may be generated using the sensor data 102, the lane data 226, or a combination thereof. For example, one or more lanes may be identified using the sensor data 102 in combination with a lane detection algorithm or machine learning model, and one or more additional lanes may be identified using the lane data 226 (e.g., from a map application). The output of the lane detection may include lines (e.g., polylines represented by a plurality of vertices) corresponding to lane lines, boundary lines, merge lines, division lines, and/or other lines of the driving surface.

Figure 6A:
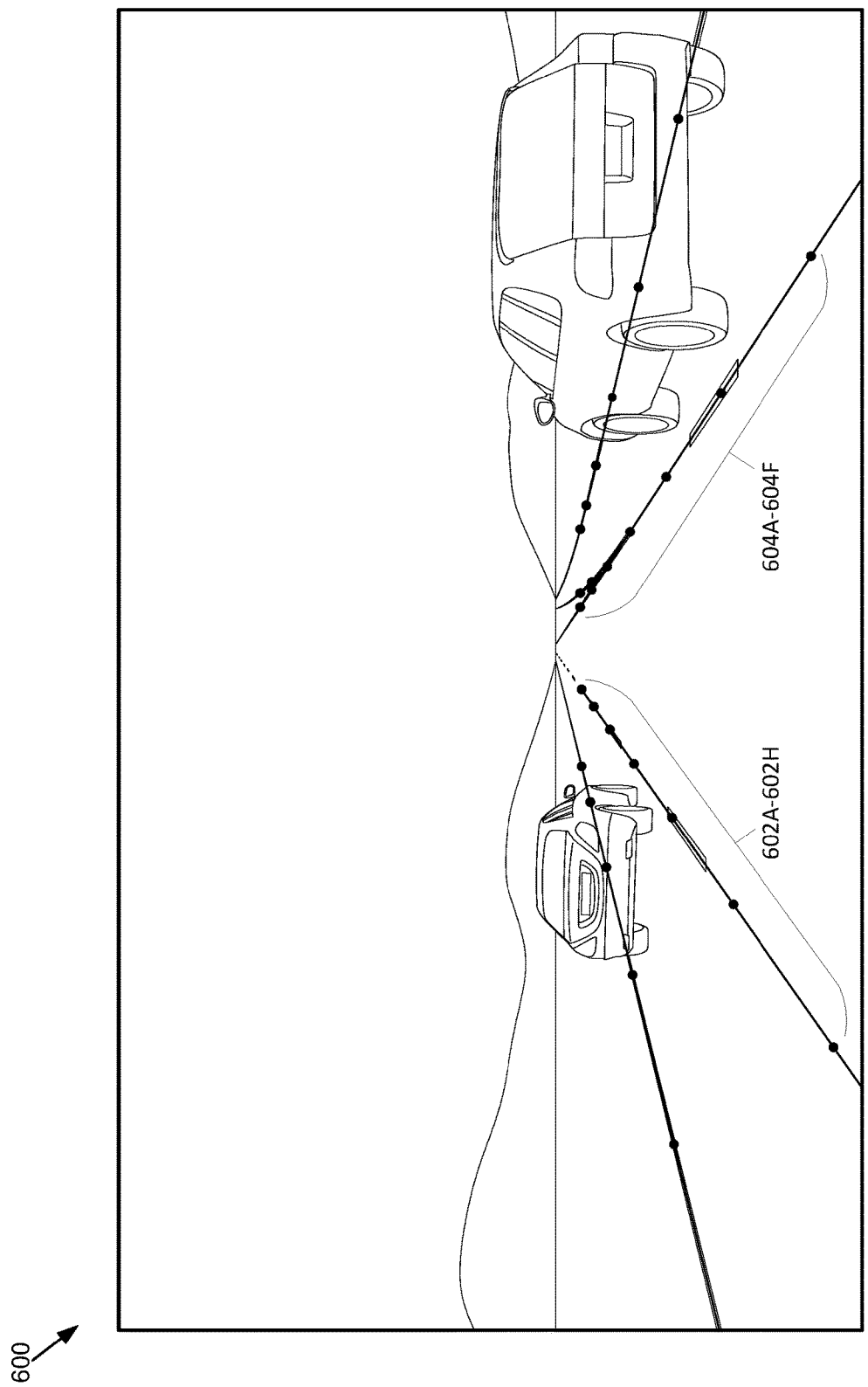
FIG. 6A is an illustration of poly-points demarcating lanes as generated by a lane detection algorithm, in accordance with some embodiments of the present disclosure.

In non-limiting examples, the output of lane detection 112 may include points (e.g., pixels) in the image(s) where lane boundaries (e.g., poly-points 602A-602H and 604A-604F of visualization 600 of FIG. 6A) are determined to be located. Polylines (e.g., polylines 622A-622G and 624A-624E of visualization 620 of FIG. 6B) may be generated by connecting adjacent poly-points for the respective lanes and/or boundaries, where connections between polylines may define an extent of a lane line or boundary for an image. As such, the poly-points and/or polylines may demarcate or delineate the detected lanes, off-ramps, on-ramps, boundaries, and/or other features in the environment as represented by the sensor data 102 (e.g., images) and/or the map data 226 (e.g., lane graphs and/or maps).

In order to determine a lane mask 116, in some embodiments, lane triangulation 114 may be executed. For example, using the output of lane detection 112 (e.g., the poly-points corresponding to the polylines), lane triangulation 114 may be used to generate the lane mask 116. In such an example, lane triangulation 114 may connect the poly-points between adjacent polylines in a pattern, such as a crisscross pattern. In a non-limiting example, and as illustrated in FIG. 6C, every poly-point may be connected in a crisscross fashion to a poly-point of an adjacent polyline corresponding to the same line (e.g., poly-points from a left side lane line may be connected to poly-points from a right side lane line). A first poly-point (e.g. bottom-most poly-point) of a first polyline may be connected to a first (or second) poly-point from a second polyline, and the first (or second) poly-point from the second polyline may be connected to a second poly-point from the first polyline, and so on, until each of the poly-points are connected to form triangles, as illustrated in visualization 640 of FIG. 6C. In some non-limiting examples, lane triangulation 114 may use monotone polygon triangulation to generate the lane mask 116. The polylines may be assumed to be monotone in at least one axis (e.g., direction) and non-curving. A vector may be determined between the end polyline point and the beginning polyline point in the respective lane. The vectors may then be used to generate the triangles (e.g., triangles 642A-642X of FIG. 6D) for rendering the lane mask 116 to determine the pixels within the image that correspond to each lane, off-ramp, on-ramp, or other demarcated portion of the driving surface.

In some embodiments, a lane regression algorithm may be used for lane triangulation 114 to generate the lane mask 116. The lane regression algorithm may regress a line through the polylines to generate the triangle. For example, any known regression algorithm may be used to generate the triangles. The lane mask 116 may be generated using the triangles generated for each lane by the lane triangulation 116. The combination of the rendered triangles may form polygons in image space, where each polygon may correspond to a lane.

As a result of lane triangulation 114 and/or another mask generation approach, the lane mask 116 may be generated to represent pixels in image space that correspond lanes or other portions of the driving surface. In some examples, each pixel in the lane mask 116 may be indexed as a color corresponding to a respective lane (e.g., with respect to visualization 660 of FIG. 6D, pixels for a left lane 662 may be a first color or pattern, pixels for a middle or ego-lane 664 may be a second color or pattern, and pixels for a third lane 666 may be a third color or pattern).

In embodiments, a scale factor may be used to scale down the lane mask 116. For example, the lane mask may be scaled down by a predetermined scale factor (e.g., half, a quarter, etc.) to increase performance or decrease run-time. Even after scaling, the lane mask 116 may retain the fidelity of the source image(s), map(s) and/or graph(s) used to generate the lane mask 116 because, in embodiments, a look up may be performed based on the scale such that each pixel in the sensor data 102 may be scaled down by the scale factor—thereby retaining information from an higher spatial resolution even at the lower, scaled-down resolution. In such an example, the sensor data 102 may be scaled down before lane triangulation 114 and a rasterizer may be used to scale down the sensor data 102 (e.g., images). The scaled down sensor data 102 may then be used for lane triangulation 114. In such embodiments, the object fence 110 (e.g., pixels of the object fence 110) may also be scaled down by the same scale factor.

In some examples, lane extension 122 and/or virtual lane generation 124 may be used to extend the detected lanes and/or generate lanes in the lane mask 116—such as where a full or useable extent of lanes is not generated for the lane mask 116 as a result of lane detection 112 and/or lane triangulation 114. A predetermined length for lanes may be used to determine whether lane extension 122 may be performed to extend a lane(s). In such examples, a lane extension algorithm or machine learning model (such as those described herein) may be used to extend the lane(s). Any known lane extension algorithm may be used—such as but not limited to curve fitting and/or lane extrapolation—to generate lane extensions (e.g., lane extension 682, 684, 686, and 688 in visualization 680 of FIG. 6E). Such lane extension may reduce false positives for lane assignments for detected objects by generating more depth for lane mask 116. Further, in some examples, the lane extension algorithm may be configured to limit the lane extension when the extension intersects with another lane boundary.

Virtual lane generation 124 may be executed where one or more lanes (e.g., below a threshold number of lanes) are not detected. As such, Virtual lane generation 124 may be used when there is limited lane data 126 and/or sensor data 102 for lane detection 112. In embodiments, a pre-determined number of lanes may be used to determine whether virtual lanes should be generated. For example, where a threshold is three lanes, when three lanes are not detected, virtual lanes may be generated to fill in the gaps. The three lanes, in such an example, may include at least an ego-lane of the vehicle 900, and an adjacent lane on either side of the ego-lane. Similar to lane extension 122, an algorithm or a machine learning model may be used to determine a number of virtual lanes to be generated and locations of the virtual lanes to be generated. By generating virtual lanes, even if not as accurate as actual detections, objects may be assigned to virtual lanes to provide a better understanding to the vehicle 900 of locations of objects relative to a path of the ego-vehicle.

Once the object fence(s) 110 and the lane mask 116 are generated, overlap determination 118 may be executed to determine which object fences—or portions thereof—are in each of the lanes or other demarcated portions of the environment. As such, overlap determination 118 may use the lane mask 116 and the object fence 110 to determine an overlap between the pixels and/or boundaries of the object fence 110 and the lane mask 116 (e.g., in 2D image space).

In some examples, an object may be assigned to a lane(s) in the lane mask—during lane assignment 120—based on an overlap of pixels in the object fence 110 with the lane pixels in the lane mask 116. Pixel counting 132 may be used to determine the overlap between the pixels of the object fence 110 and the lane mask 116 such that each object having a corresponding object fence 110 may be assigned to one or more lanes based on a pixel count. The pixels in the entirety of the object 110 fence may be matched against the lane pixels for each lane in the lane mask 116, and the object may be assigned to one or more lanes based on the pixel counts for object fence 110 pixels in each lane. The pixel index (e.g., color or pattern, as described with respect to FIG. 6D) associated with lane mask 116 may then be used to determine what lane the particular pixel overlaps with. In some examples, in order to associate an object with a lane, a number of overlapping pixels may be required to be above a threshold (e.g., greater than twenty pixels, greater than forty pixels, greater than ten percent of the pixels of the object fence 110, etc.). By using a threshold, false positives may be reduced because object fences 110 that slightly overlap with a lane may be discounted (which may account for some inaccuracy in the object fence 110).

In some embodiments, in addition to or alternatively from pixel counting 132, boundary scoring 134 may be performed to determine the overlap between the pixels of the object fence 110 and the lane mask 116. In such examples, the object fence 110 may be represented by vertices (e.g., pixels) along the perimeter of the object fence 110 (e.g., vertices 702A, 702B, 702C, . . . , 702N). Pixel distances may be determined between the vertices of the object fence 110 to determine the overlap. For example, where an object is in a single lane, the pixel distances between each set of two perimeter pixels may be calculated, added up, and normalized to create a ratio of intersection per lane—which would be 1/1 for a single lane.

In examples where an object may be in more than one lane, a set of points that crosses the lane boundary may be determined. For example, it may be determined that vertex 702B and vertex 702C are split along a lane line. As such, a cross point 722A (or new vertex) may be determined by finding a point between the vertices 702B and 702C that is on the lane line. Once the cross point or new vertex may then be used to determine the distance (e.g., a pixel distance, along a straight line, along a boundary of the object fence 100, etc.) between the new vertex and each other perimeter pixel or vertex of the object fence 110 on either side of the crossing. A first sum of distances between the new vertex and a first set of perimeter pixels corresponding to the object fence 110 in a first lane may be calculated and a second sum of distances between the new vertex and a second set of perimeter pixels corresponding to the object fence 110 in a second lane may be calculated. These sums may then be normalized, in some embodiments. Ultimately, a ratio of intersection per lane may be determined based on the first sum of distances and the second sum of distances. Knowing the ratio of intersection, and how the ratio changes from frame to frame, may provide an indication of the trajectory of the object (e.g., switching lanes, swerving, lane keeping, etc.). In addition, the ratio of intersection may be used to assign the object to multiple lanes during lane assignment 120.

The overlap determination 118 may be used to determine the lane assignments 120 for each of the objects having respective object fences 110. In some examples, pixel counting 132 may provide a pixel count of object fence 110 pixels overlapping with lane mask 116 pixels, and the overlap may be used to determine the lane assignments. As another example, the ratio of intersection per lane for an object fence 110—as determined by the boundary scoring 134—may be used to assign the object to two or more lanes. The lane assignments 120 may represent a current lane of travel for a corresponding object. The lane assignments 120 may be used by vehicle 900 when making decisions, such as what path or trajectory vehicle 900 should or may follow, whether to brake, accelerate, or change lanes, and/or other decision types.

In some embodiments, temporal smoothing 142 may be performed to leverage prior lane assignments 120 for previous frame(s) and/or image(s) for an object to estimate the location and/or lane assignment of the object in subsequent frame(s) and/or image(s). For example, because lane assignments may be more accurate when an object is closer to a sensor(s) of vehicle 900, as the object is moving further away, the prior lane assignment 120 may be leveraged to provide more accurate predictions of the object location and lane assignment at further distances—e.g., where the lanes appear to merge in image space. In such examples, a prior prediction(s) may be weighted with respect to current predictions of lane assignment 120 (e.g., 90% for current prediction/10% for prior prediction(s), 70% for current prediction/20% for immediately preceding prediction/10% for two predictions prior, etc.). Temporal smoothing may thus leverage prior predictions to improve the accuracy of the lane assignments 120 within the process 100.

Figure 2A:
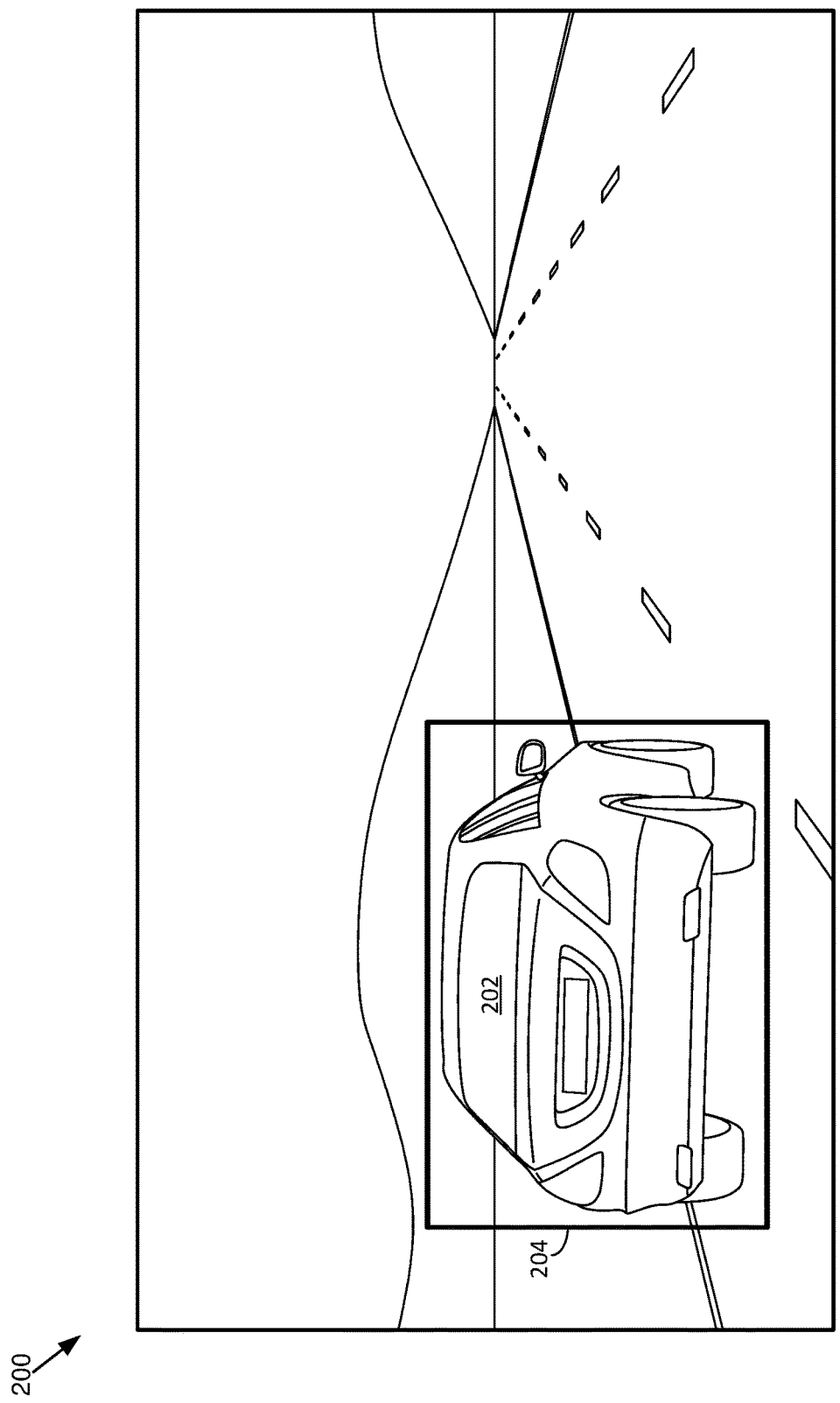
FIG. 2A is an illustration of an example bounding shape prediction for a vehicle detected in an image generated by a vehicle sensor, in accordance with some embodiments of the present disclosure.
Figure 2B:
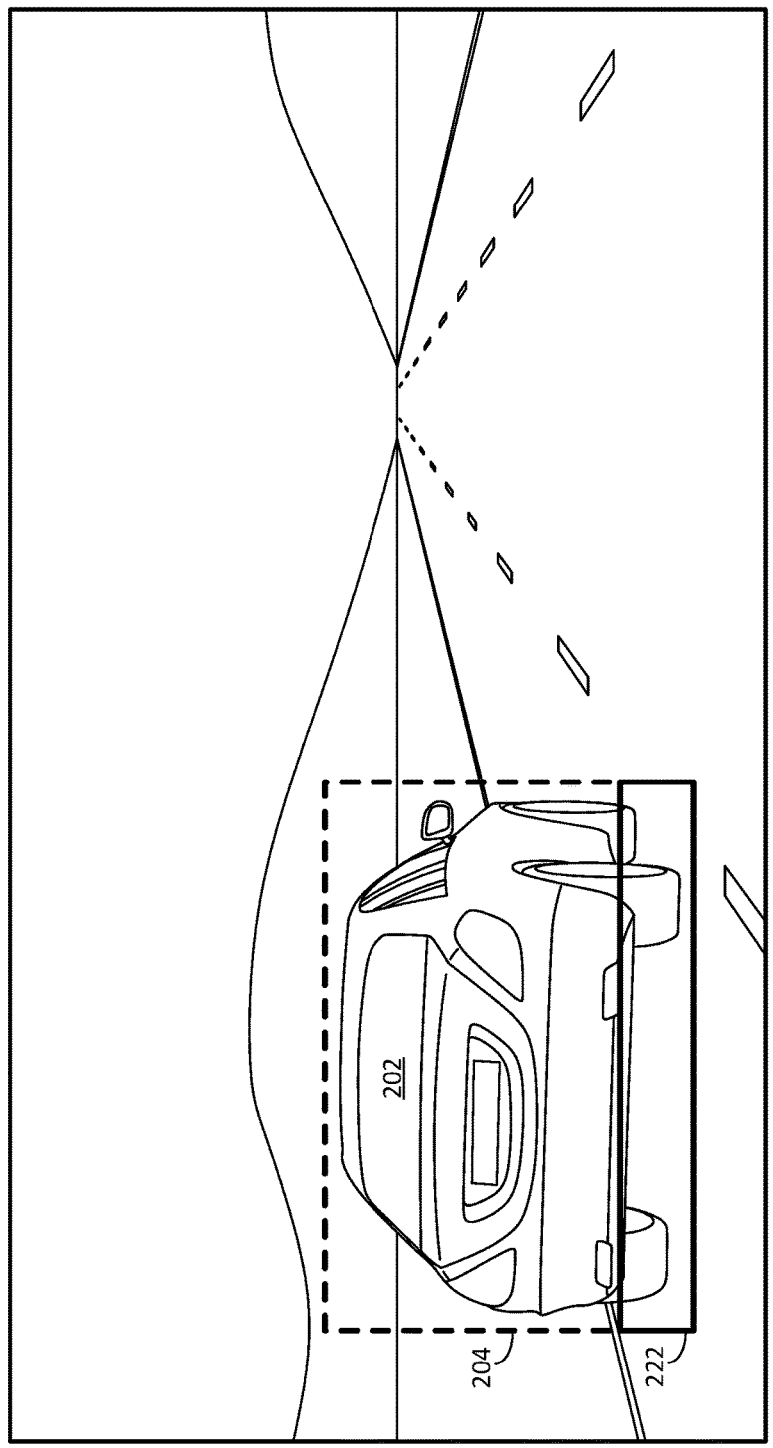
FIG. 2B is an illustration of an example cropped bounding shape for a vehicle detected in an image, in accordance with some embodiments of the present disclosure.
Figure 2C:
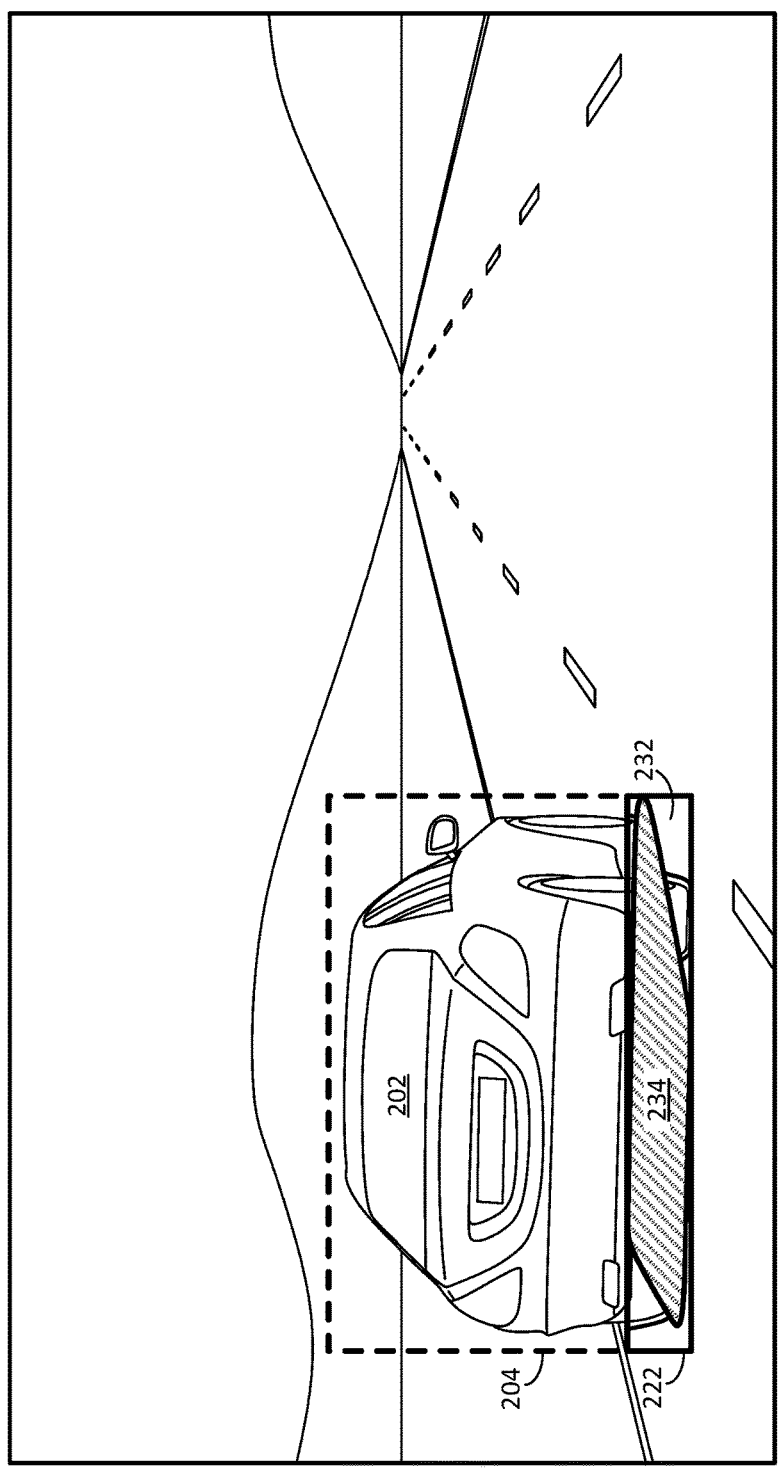
FIG. 2C is an illustration of an example drivable freespace prediction in an environment, in accordance with some embodiments of the present disclosure.
Figure 2D:
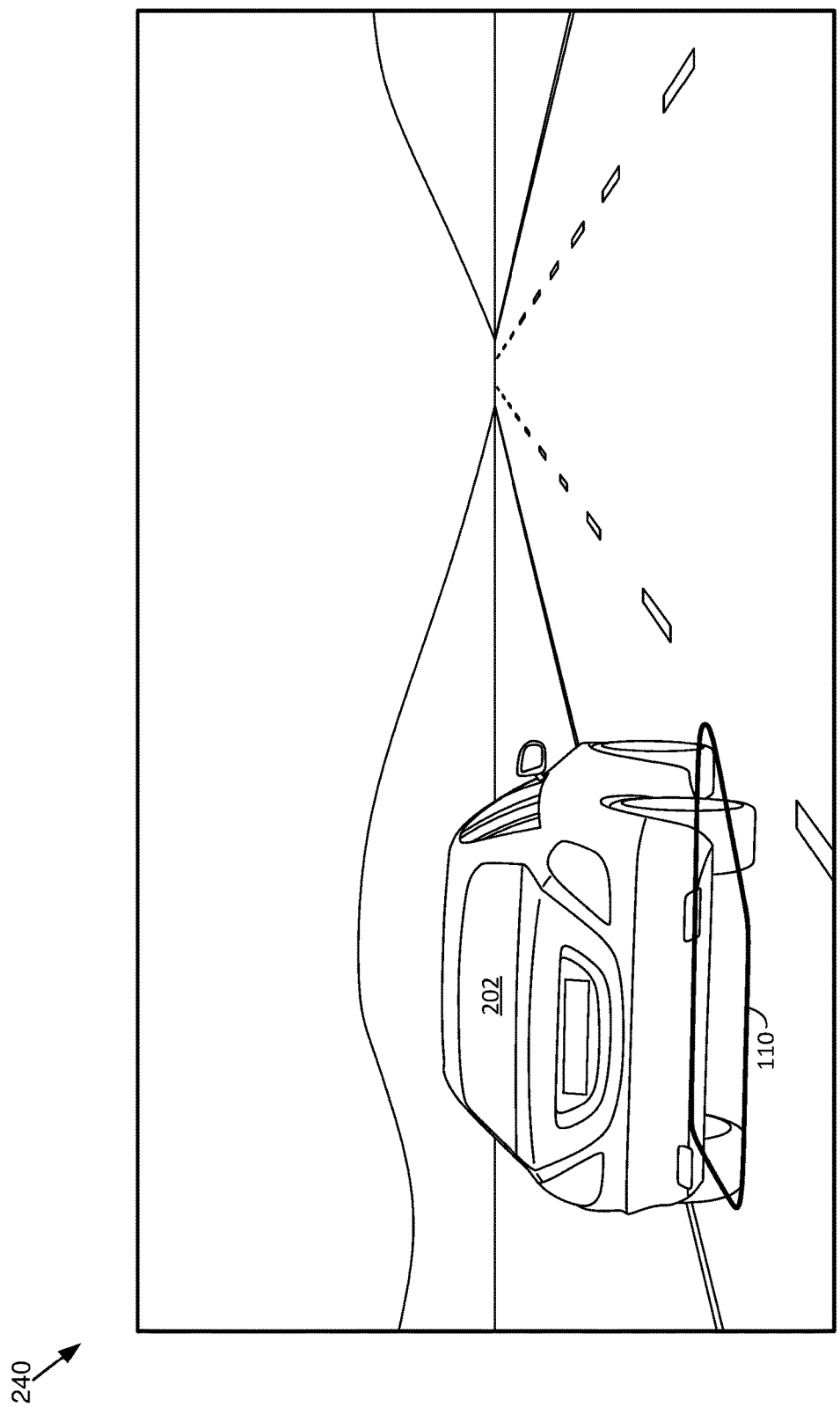
FIG. 2D is an illustration of an object fence for a vehicle generated using a drivable freespace prediction and a bounding shape prediction, in accordance with some embodiments of the present disclosure.

Now referring to FIGS. 2A-2D, FIGS. 2A-2D illustrate a process to generate an object fence for a vehicle in an image using object detection 104 and freespace detection 106, in accordance with some embodiments of the present disclosure. FIG. 2A illustrates a bounding shape for a vehicle detected in an image generated by a vehicle sensor. A bounding shape 204 may be generated for the vehicle 202—as represented in the visualization 200—using an object detection algorithm and/or a machine learning model. In some examples, the bounding shape 204 may be a bounding box surrounding the vehicle 202. The bounding shape 204 may be represented as points (e.g., pixels) within the input image 200 where the vehicle 202 is potentially located, such as each of the pixels corresponding to the bounding shape 204, vertices along a perimeter of the bounding shape 204, or a combination thereof.

FIG. 2B illustrates a cropped bounding shape 222 for a vehicle 202 detected in an image, in accordance with some embodiments of the present disclosure. For example, at least a portion of the bounding shape 204 may be cropped to generate the cropped bounding shape 222, as described herein.

FIG. 2C illustrates defining an object fence using a drivable freespace determination, in accordance with some embodiments of the present disclosure. For example, the drivable freespace 232—as described herein—may be cropped out of the bounding shape 204 and/or the cropped bounding shape 222 to generate an object fence 110. Although only illustrated as drivable freespace 323 and non-drivable space 234 within the cropped bounding shape 222 of FIG. 2C, this is not intended to be limiting. In some examples, some or all of each image may be demarcated as drivable freespace or non-drivable space, and the portion of this output corresponding to the bounding shape 204 and/or the cropped bounding shape 222 may be used to generate the object fence 110.

FIG. 2D illustrates an object fence for a vehicle generated by removing drivable freespace from an object bounding shape, in accordance with some embodiments of the present disclosure. As illustrated in FIG. 2D, the drivable freespace 232 may be removed from the cropped bounding shape 222 to generate the object fence 110.

Figure 3:
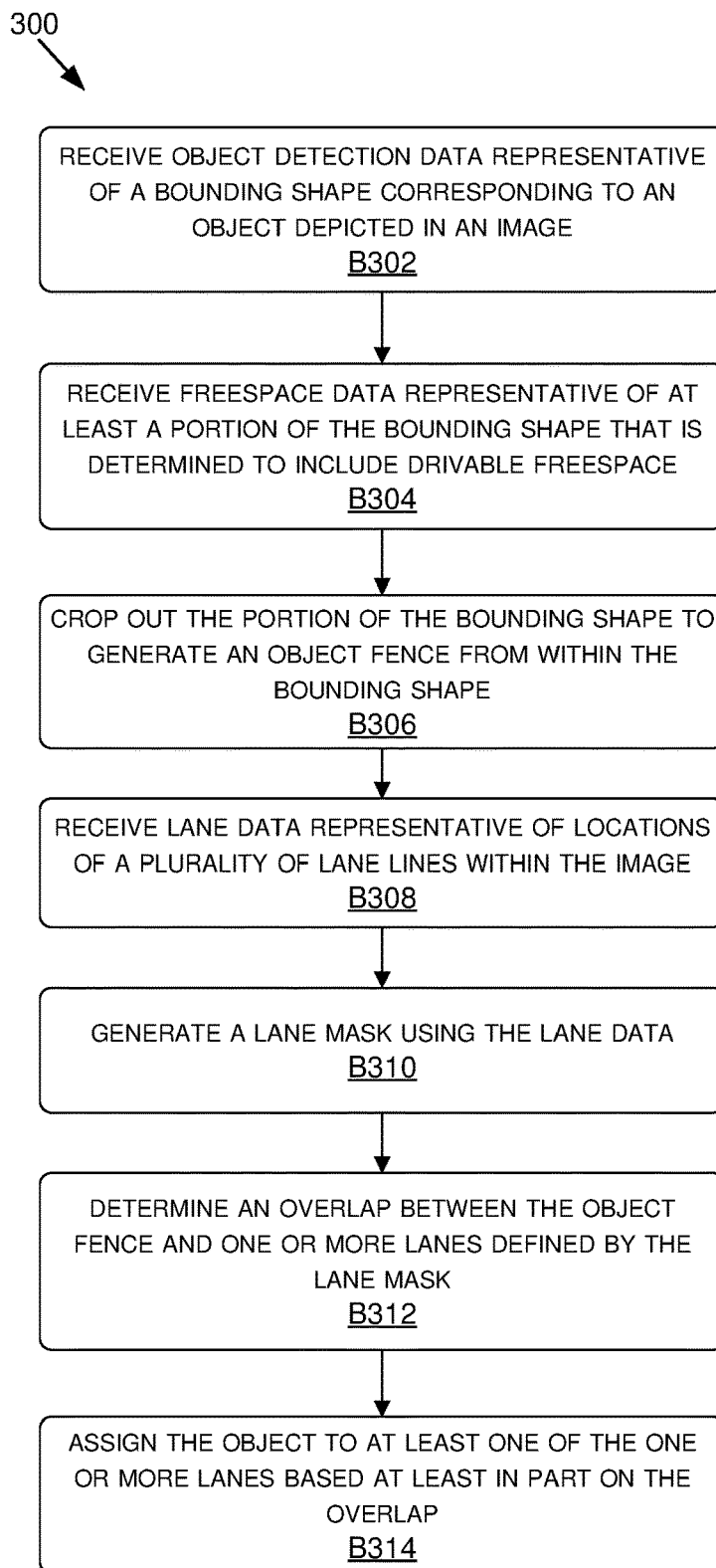
FIG. 3 is a flow diagram illustrating an example process for determining lane assignments for objects in an environment, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 300 is described, by way of example, with respect to the process 100 for determining lane assignments for objects in an environment of FIG. 1. However, the method may additionally or alternatively be executed by any one system, or any combination of systems, including, but not limited to, those described herein.

FIG. 3 is a flow diagram showing a method 300 for determining lane assignments for objects in an environment, in accordance with some embodiments of the present disclosure. The method 300, at block B302, includes receiving object detection data representative of a bounding shape corresponding to an object depicted in an image. For example, a bounding shape corresponding to an object (e.g., a vehicle, a pedestrian, debris, etc.) depicted in an image (e.g., as represented by sensor data 102) may be received after object detection 112. In some examples, the bounding shape may be a cropped bounding shape (e.g., cropped bounding shape 222 of FIG. 2B) representing a portion of the bounding shape.

The method 300, at block B304, includes receiving freespace data representative of at least a portion of the bounding shape that is determined to include drivable freespace. For example, the freespace data representative of at least a portion of the bounding shape that is determined to include drivable freespace may be received after freespace detection 106 is performed on the sensor data 102.

The method 300, at block B306, includes cropping out the portion of the bounding shape to generate an object fence from within the bounding shape. For example, the object fence 110 may be generated by cropping out the portion of the bounding shape from object detection 102 that represents the freespace data from the freespace determination 106.

The method 300, at block B308, includes receiving lane data representative of locations of a plurality of lane lines within the image. For example, lane data representative of a location of a plurality of lane lines within the sensor data 102 and/or the lane data 126 may be received after lane detection 112 is performed.

The method 300, at block B310, includes generating a lane mask using the lane data. For example, the lane mask 116 may be generated—e.g., using lane triangulation 114—from the lane data received from the lane detection 112.

The method 300, at block B312, includes determining an overlap between the object fence and one or more lanes defined by the lane mask. For example, overlap between the object fence 110 and the one or more lanes defined by the lane mask 116 may be determined by overlap determination 110 using pixel counting 132 and/or boundary scoring 134.

The method 300, at block B314, includes assigning the object to at least one of the one or more lanes based at least in part on the overlap. For example, lane assignment 120 may be used to assign the object to at least one of the one or more lanes from the lane mask 116.

Figure 4:
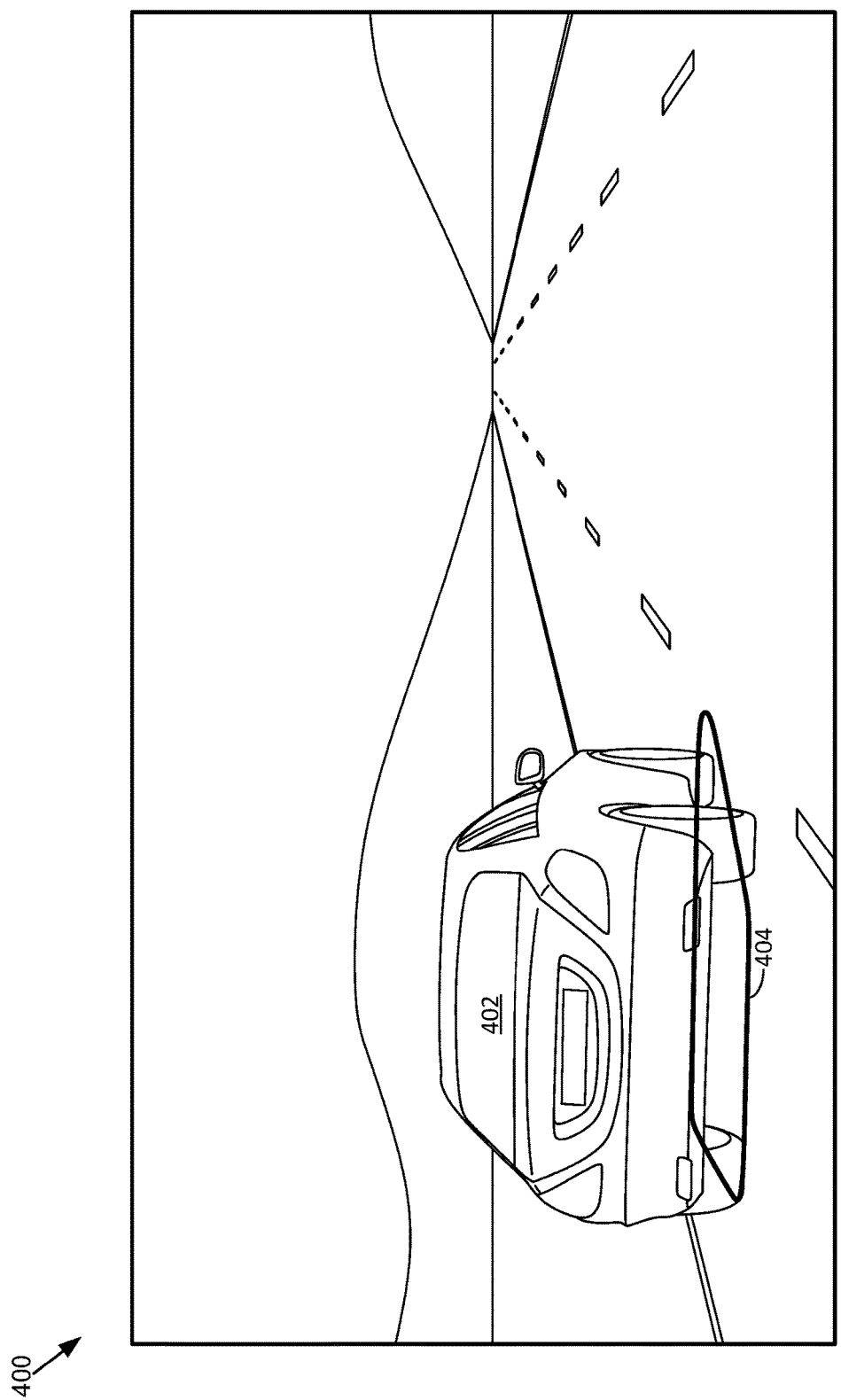
FIG. 4 is an illustration of an object fence for a vehicle generated by a fence generation algorithm, in accordance with some embodiments of the present disclosure.

Referring to FIG. 4, FIG. 4 illustrates an object fence 404 for a vehicle generated by a fence generation algorithm, in accordance with some embodiments of the present disclosure. A fence generation algorithm 108, as described herein, may be used to generate the object fence 404 for vehicle 402.

Figure 5:
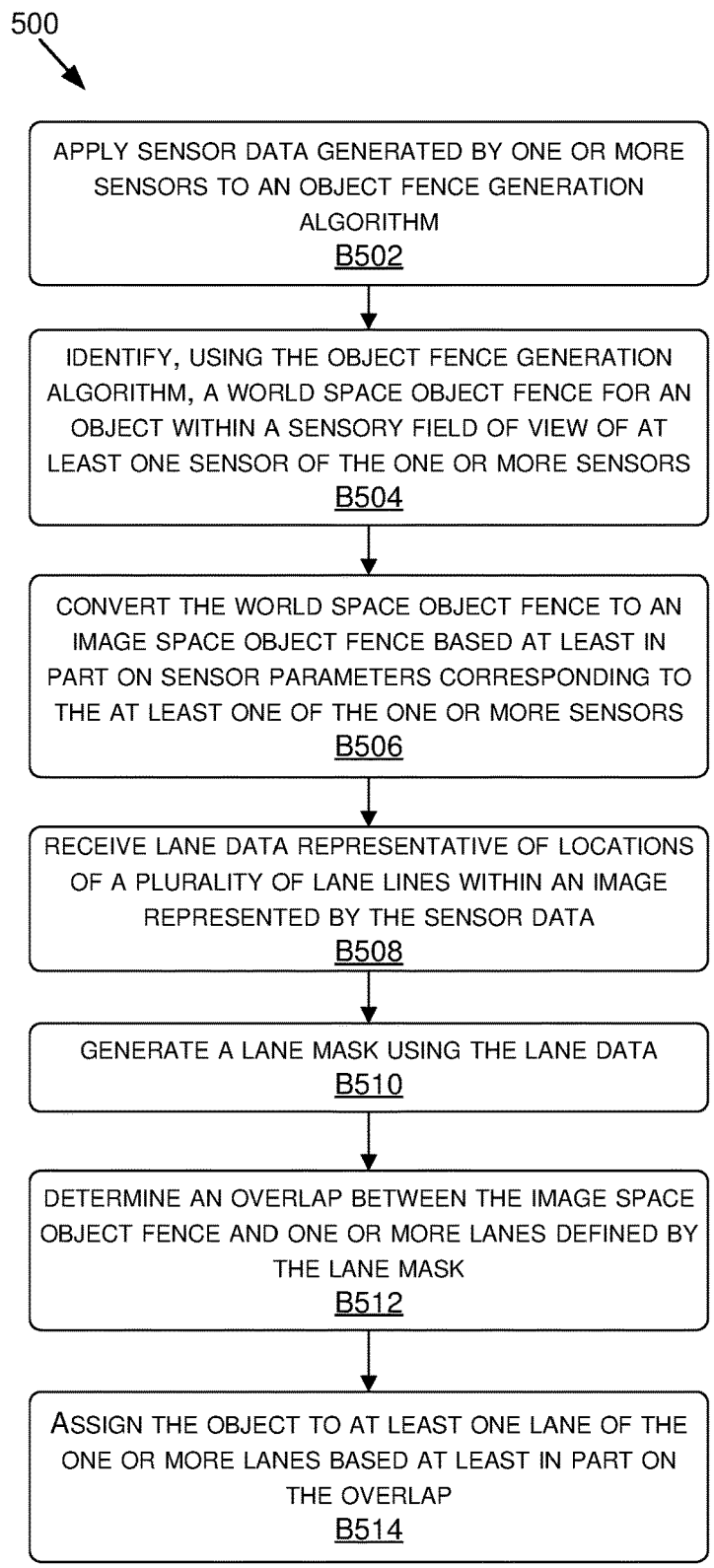
FIG. 5 is a flow diagram illustrating an example process for determining lane assignments for objects in an environment, in accordance with some embodiments of the present disclosure.

Now referring to FIG. 5, each block of method 500, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 500 is described, by way of example, with respect to the process 100 for determining lane assignments for objects in an environment of FIG. 1. However, the method may additionally or alternatively be executed by any one system, or any combination of systems, including, but not limited to, those described herein.

FIG. 5 is a flow diagram showing a method 500 for determining lane assignments for objects in an environment, in accordance with some embodiments of the present disclosure. The method 500, at block B502, includes applying sensor data generated by one or more sensors to an object fence generation algorithm. For example, the sensor data 102 generated by one or more sensors may be applied to the fence generation algorithm 108.

The method 500, at block B504, includes identifying, using the object fence algorithm, a world space object fence for an object within a sensory field of view of at least one sensor of the one or more sensors. For example, the object fence algorithm 108 may be used to identify the object fence 110 in world space for the object within the sensory field of at least one sensor of the one or more sensors from which sensor data 102 is received.

The method 500, at block B506, includes converting the world space object fence to an image space object fence based at least in part on sensor parameters corresponding to the at least one of the one or more sensors. For examples, the fence generation algorithm 108 may be used to convert an object fence 110 from world space to image space based at least in part on the sensor parameters corresponding to the at least one of the one or more sensors.

The method 500, at block B508, includes receiving lane data representative of location of a plurality of lane lines within an image represented by the sensor data. For examples, lane data representative of location of a plurality of lane lines within an image represented by the sensor data 102 may be received via the lane detection 112.

The method 500, at block B510, includes generating a lane mask using the lane data. For example, the lane mask 116 may be generated—e.g., using lane triangulation 114—using the lane data received after lane detection 112.

The method 500, at block B512, includes determining an overlap between the image space object fence and one or more lanes defined by the lane mask. For example, overlap between object fence 110 and the one or more lanes defined by the lane mask 116 may be determined by overlap determination 110 using pixel counting 132 and/or boundary scoring 134.

The method 500, at block B514, includes assigning the object to at least one of the one or more lanes based at least in part on the overlap. For example, lane assignment 120 may be used to assign the object to at least one of the one or more lanes in the lane mask 116.

Now referring to FIGS. 6A-6E, FIGS. 6A-6E illustrate a process for generating lane mask using lane data, in accordance with some embodiments of the present disclosure. FIG. 6A illustrates poly-points demarcating lanes as generated by a lane detection algorithm. A lane detection algorithm may detect lane lines in input images from the sensor data 102. The lane lines may include poly-points 602A-602H and 604A-604F demarcating lanes on a driving surface of the vehicle 900. The poly-points may be points (e.g., pixels) along the lane lines.

Figure 6B:
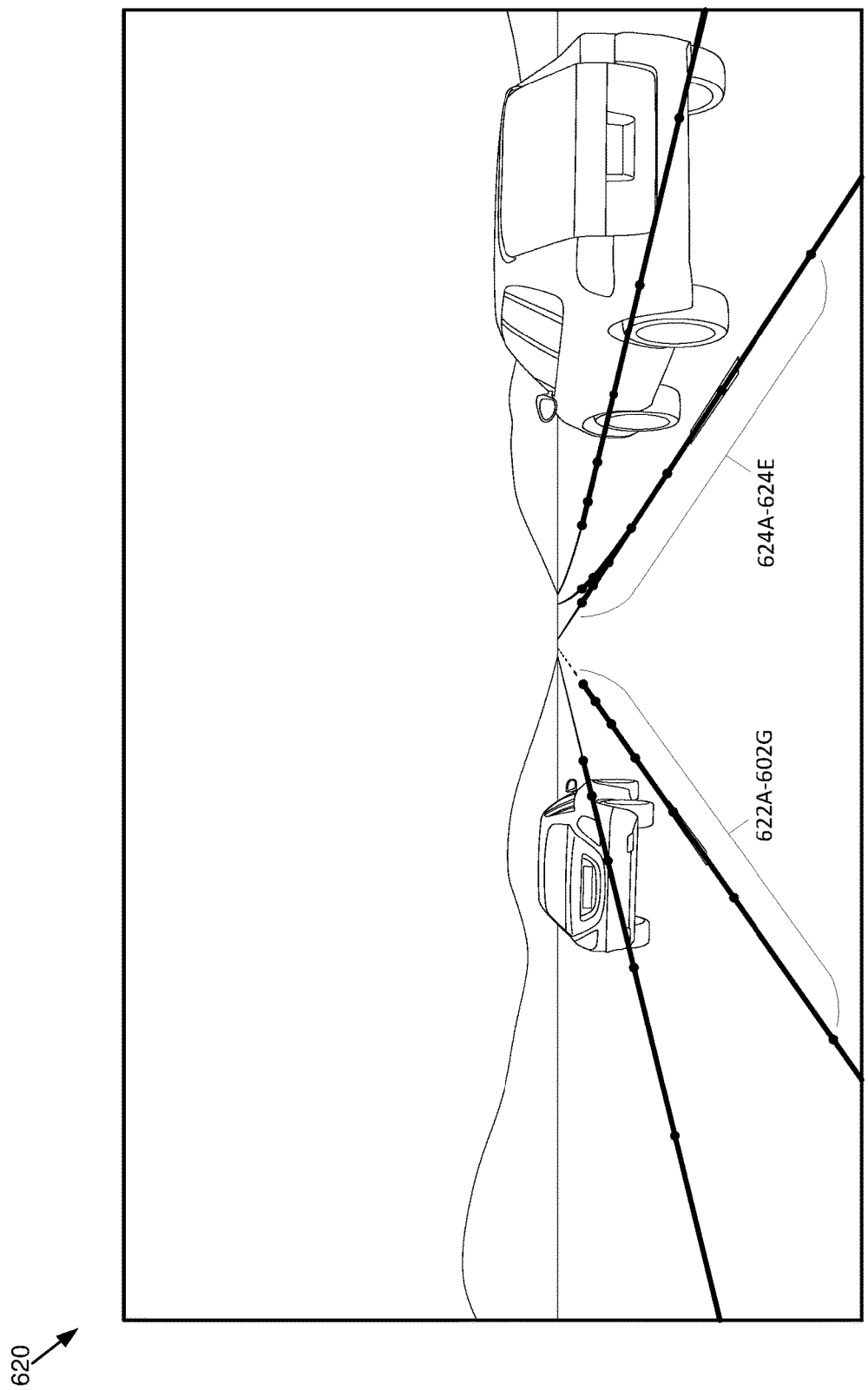
FIG. 6B is an illustration of polylines joining poly-points demarcating lanes as generated by a lane detection algorithm, in accordance with some embodiments of the present disclosure.
Figure 6C:
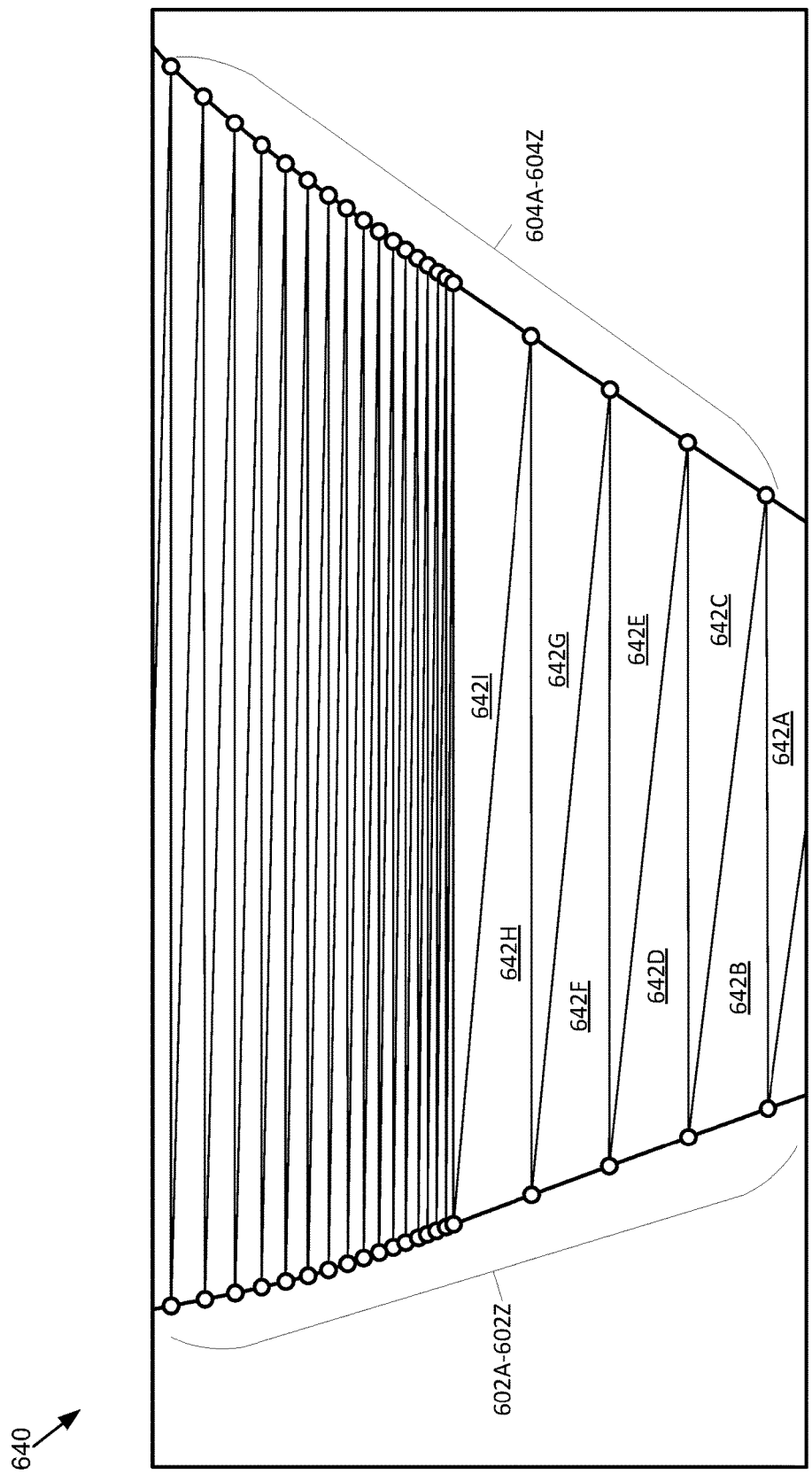
FIG. 6C is an illustration of lane triangulation performed on detected lanes to generate a lane mask, in accordance with some embodiments of the present disclosure.

FIG. 6B illustrates polylines joining poly-points demarcating lanes as generated by a lane detection algorithm, in accordance with some embodiments of the present disclosure. A lane detection algorithm may generate polylines 622A-622G and 624A-624E by joining adjacent poly-points 602A-602H and 604A-604F on lane lines for each lane, respectively. The polylines may represent lane boundaries (e.g., lines) in an image representing a driving surface of the vehicle 900.

FIG. 6C illustrates lane triangulation performed on detected lanes to generate a lane mask, in accordance with some embodiments of the present disclosure. Triangles (e.g., triangles 620A-620L, and others unnumbered) may be generated by joining poly-points 602A-602Z of a lane boundary with poly-points 604A-604Z of an adjacent lane boundary in a crisscross fashion using a lane triangulation 114. Each lane may undergo lane triangulation by generating triangles between respective lane boundaries to demarcate lanes.

Figure 6D:
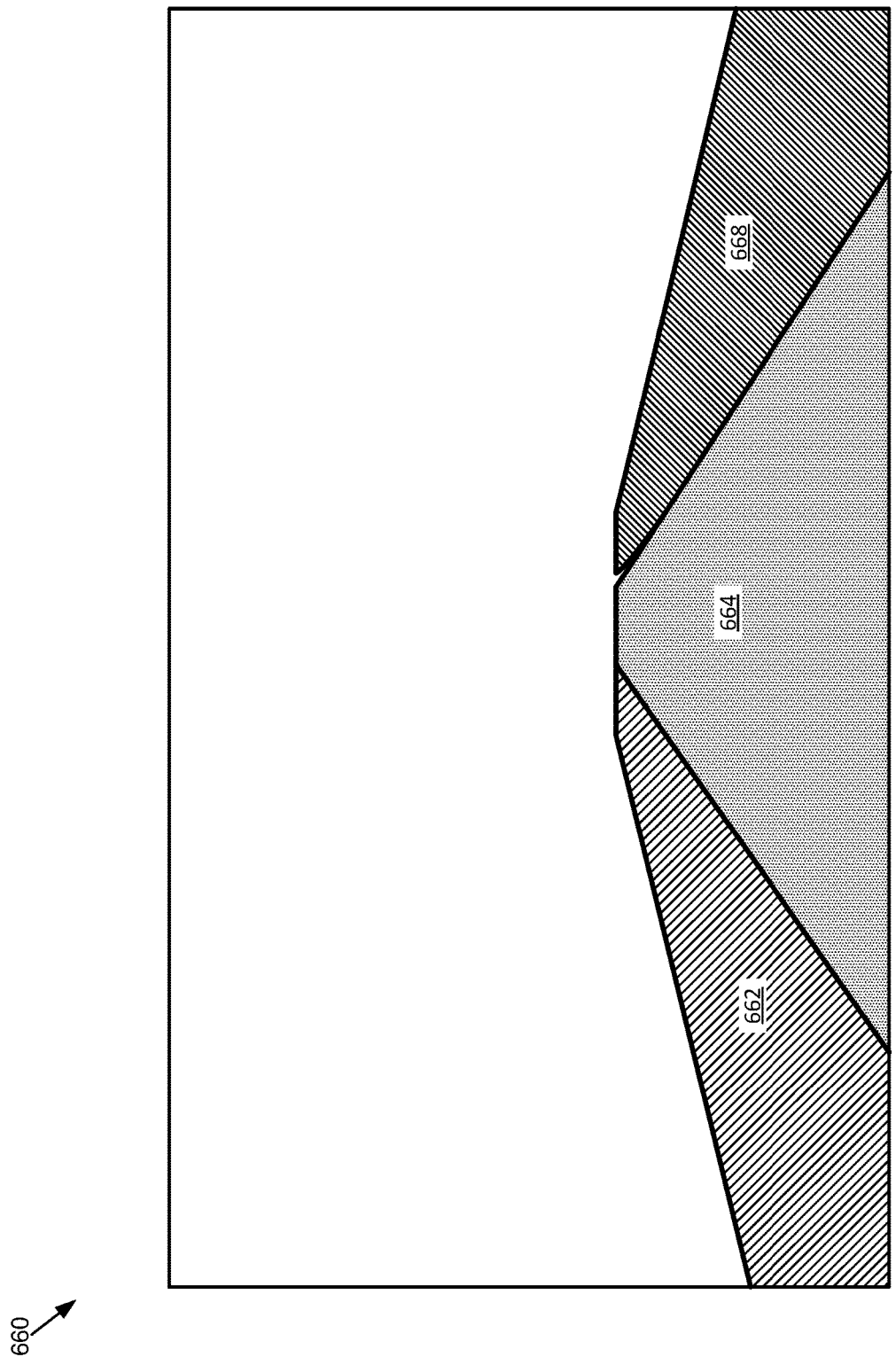
FIG. 6D is an illustration of a lane mask generated using lane data, in accordance with some embodiments of the present disclosure.

FIG. 6D illustrates a lane mask 660 generated using lane data, in accordance with some embodiments of the present disclosure. The lane mask 660 may include triangulated lanes 662, 664, and 668. Each lane may be represented in an index with a different color. The pixels within each lane may then be stored in the index under the respective lane color. The lane mask 660 represents some or all of the lanes on the driving surface of the vehicle 900.

FIG. 6E illustrates lane extension performed on a lane mask 680 to extend lanes, in accordance with some embodiments of the present disclosure. For example, lane extension 122 may be used to extend the detected lanes in the lane mask if a full or useable extent of lanes is not determined (as illustrated by the lane extensions 682, 684, 686, and 688).

Figure 7A:
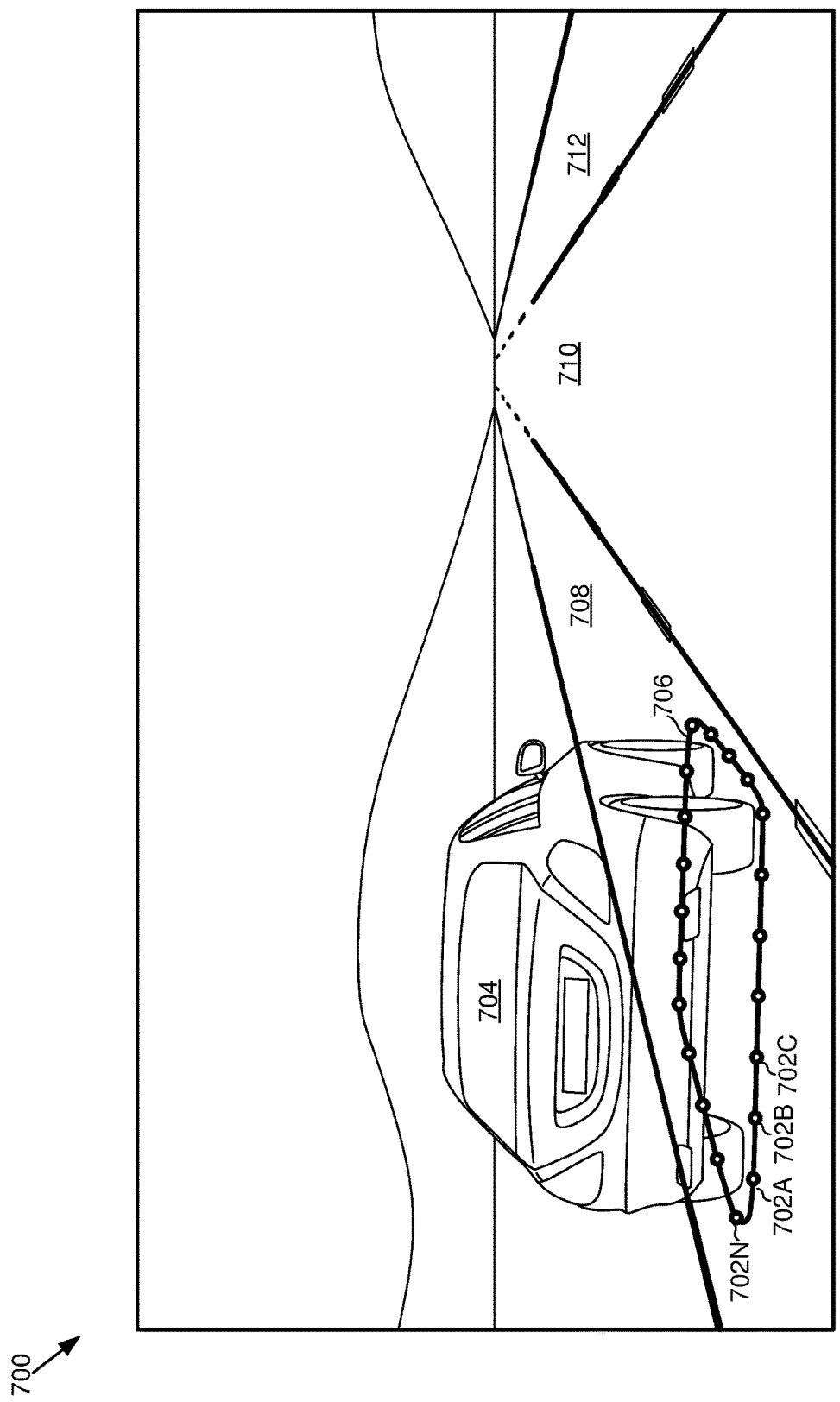
FIG. 7A is an illustration of vertices generated for an object fence to determine overlap of an object fence with lanes of a lane mask, in accordance with some embodiments of the present disclosure.
Figure 7B:
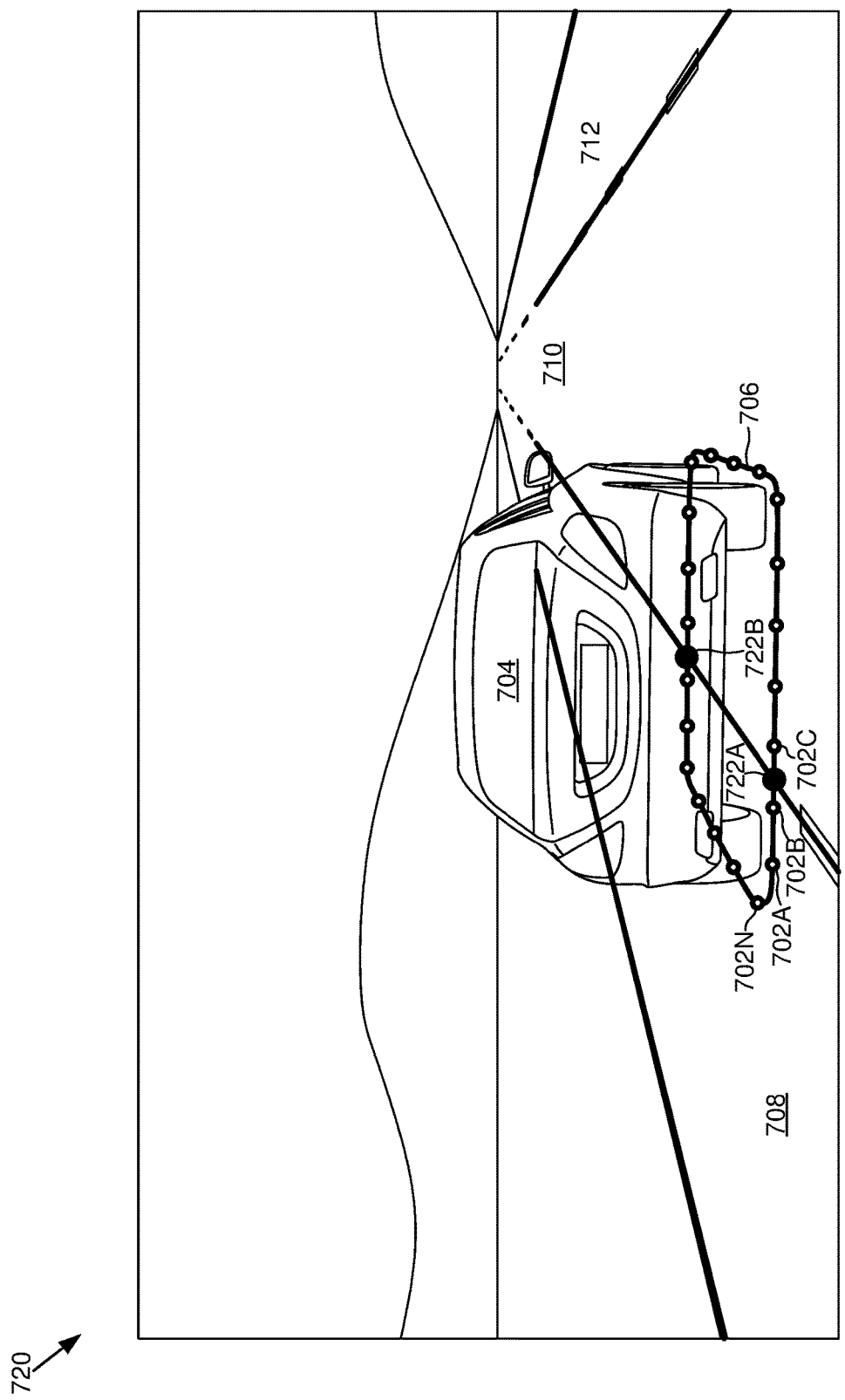
FIG. 7B is an illustration of vertices generated for an object fence to determine overlap of the object fence with lanes of a lane mask when the object fence crosses a lane boundary, in accordance with some embodiments of the present disclosure.

Referring now to FIGS. 7A-7B, FIGS. 7A-7B illustrate vertices generated for an object fence to determine overlap of object fence with lanes in lane mask, in accordance with some embodiments of the present disclosure. FIG. 7A illustrates vertices generated for an object fence to determine overlap of object fence with lanes in lane mask when the object fence is within one lane with respect to a particular frame. The object fence 706 may be represented by vertices (e.g., pixels) 702A, 702B, 702C, . . . , 702N along the perimeter of the object fence 706 for vehicle 704 in an image. Pixel distances may be determined between the vertices 702 of the object fence 706 to determine the overlap between the object fence the lane 708 of lane mask. For example, where an object is in a single lane, the pixel distances between each set of two perimeter pixels may be calculated, added up, and normalized to create a ratio of intersection per lane, which would be 1/1 for a single lane.

FIG. 7B illustrates vertices generated for an object fence to determine overlap of object fence with lanes in lane mask when the object fence crosses a lane boundary, in accordance with some embodiments of the present disclosure. Where the vehicle 704 is in more than one lane (e.g., lanes 708 and 710), a set of points that crosses the lane boundary, cross points 722A and 722B, may be determined. Once the cross points 722 are determined, these new vertices may then be used to determine the distance between the new vertex and each other perimeter pixel or vertex of the object fence on either side of the crossing, as described herein.

Figure 8:
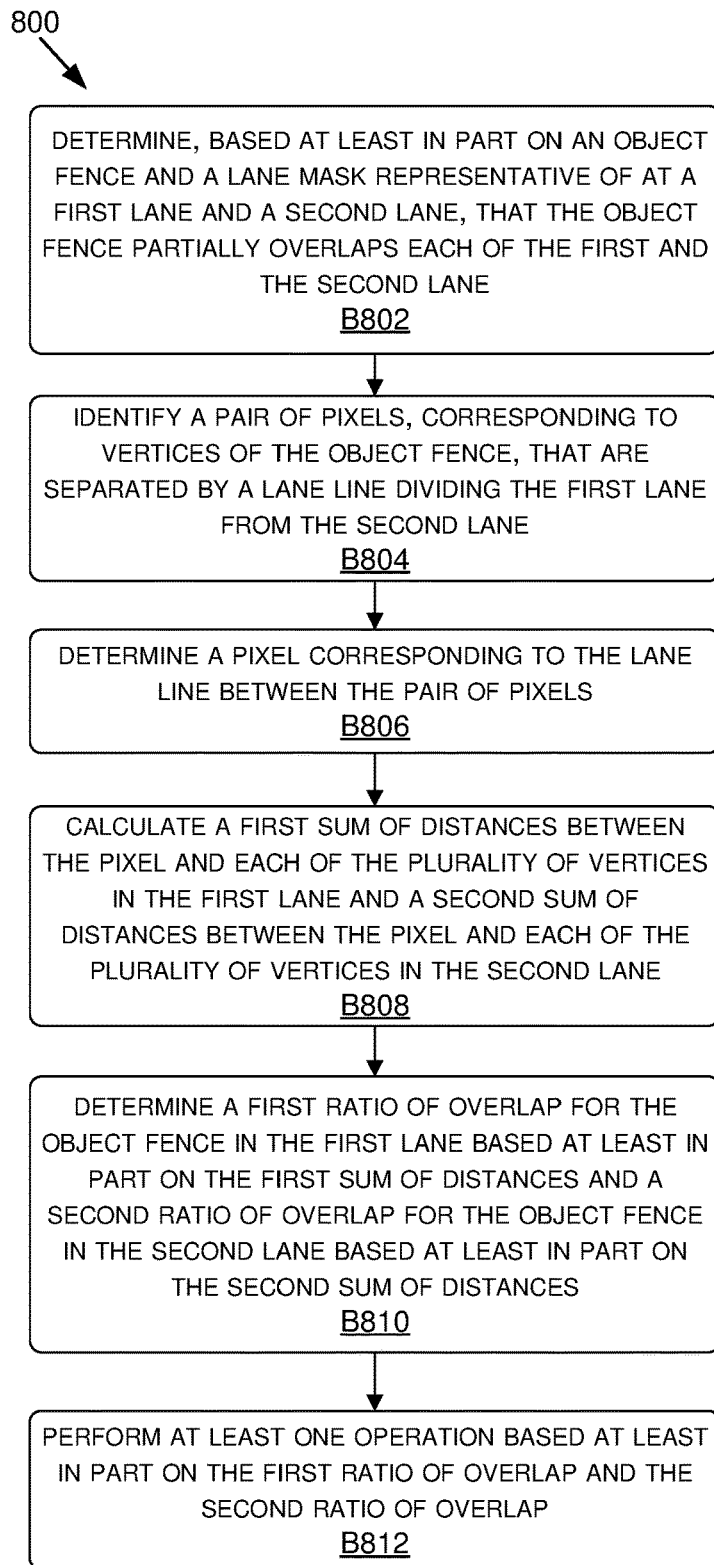
FIG. 8 is flow diagram illustrating an example process for determining ratios of pixel overlaps between an object and two lanes in an environment, in accordance with some embodiments of the present disclosure.

Now referring to FIG. 8, each block of method 800, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 800 is described, by way of example, with respect to the process 100 for determining lane assignments for objects in an environment of FIG. 1. However, the method may additionally or alternatively be executed by any one system, or any combination of systems, including, but not limited to, those described herein.

FIG. 8 is a flow diagram showing a method 800 for determining ratios of pixel overlaps between an object and two lanes in an environment, in accordance with some embodiments of the present disclosure. The method 800, at block B802, includes determining, based at least in part on an object fence and a lane mask representative of at a first lane and a second lane, that the object fence partially overlaps each of the first and the second lane. For example, overlap determination 118 may determine that the object fence 110 overlaps at least two lanes in the lane mask 116.

The method 800, at block B804, includes identifying a pair of pixels, corresponding to vertices of the object fence, that are separated by a lane line dividing the first lane from the second lane. For example, a pair of pixels (e.g., vertices 702A and 702B of FIG. 7B) of the object fence (e.g., object fence 110, object fence 706) that are separated by a lane line (e.g., lane boundary) dividing the first lane (e.g., lane 708 for FIG. 7B) from the second lane (e.g., lane 710 of FIG. 7B) may be identified via the overlap determination 118.

The method 800, at block B806, includes determining a pixel corresponding to the lane line between the pair of pixels. For examples, a pixel (e.g., cross point 722A of FIG. 7B) corresponding to the lane line between the pair of pixels (e.g., vertices 702A and 702B of FIG. 7B) may be determined by boundary scoring 134.

The method 800, at block B808, includes calculating a first sum of distances between the pixel and each of a first plurality of vertices of the object fence in the first lane and a second sum of distances between the pixel and each of a second plurality of vertices of the object fence in the second lane. For example, boundary scoring 134 may calculate a first sum of distances between the pixel (e.g., cross point 722A of FIG. 7B) and each of a first plurality of vertices of the object fence (e.g., object fence 110, object fence 706) in the first lane (e.g., lane 708 of FIG. 7B) and a second sum of distances between the pixel and each of the second plurality of vertices of the object fence in the second lane (e.g., lane 710 of FIG. 7B).

The method 800, at block B810, includes determining a first ratio of overlap for the object fence in the first lane based at least in part on the first sum of distances and a second ratio of overlap for the object fence in the second lane based at least in part on the second sum of distances. For example, the boundary scoring 134 may determine a first ratio of overlap for the object fence 110 (or object fence 706 of FIG. 7B) in the first lane (e.g., lane 708 of FIG. 7B) based at least in part on the first sum of distance and a second ratio of overlap for the object fence in the second lane (e.g., lane 710 of FIG. 7B) based at least on the second sum of distance.

The method 800, at block B812, includes performing at least one operation based at least in part on the first ratio of overlap and the second ratio of overlap. For example, the lane assignment 120 may assign the object to lanes based on the first ratio of overlap and the second ratio of overlap as determined via the boundary scoring 134.

Example Autonomous Vehicle

Figure 9A:
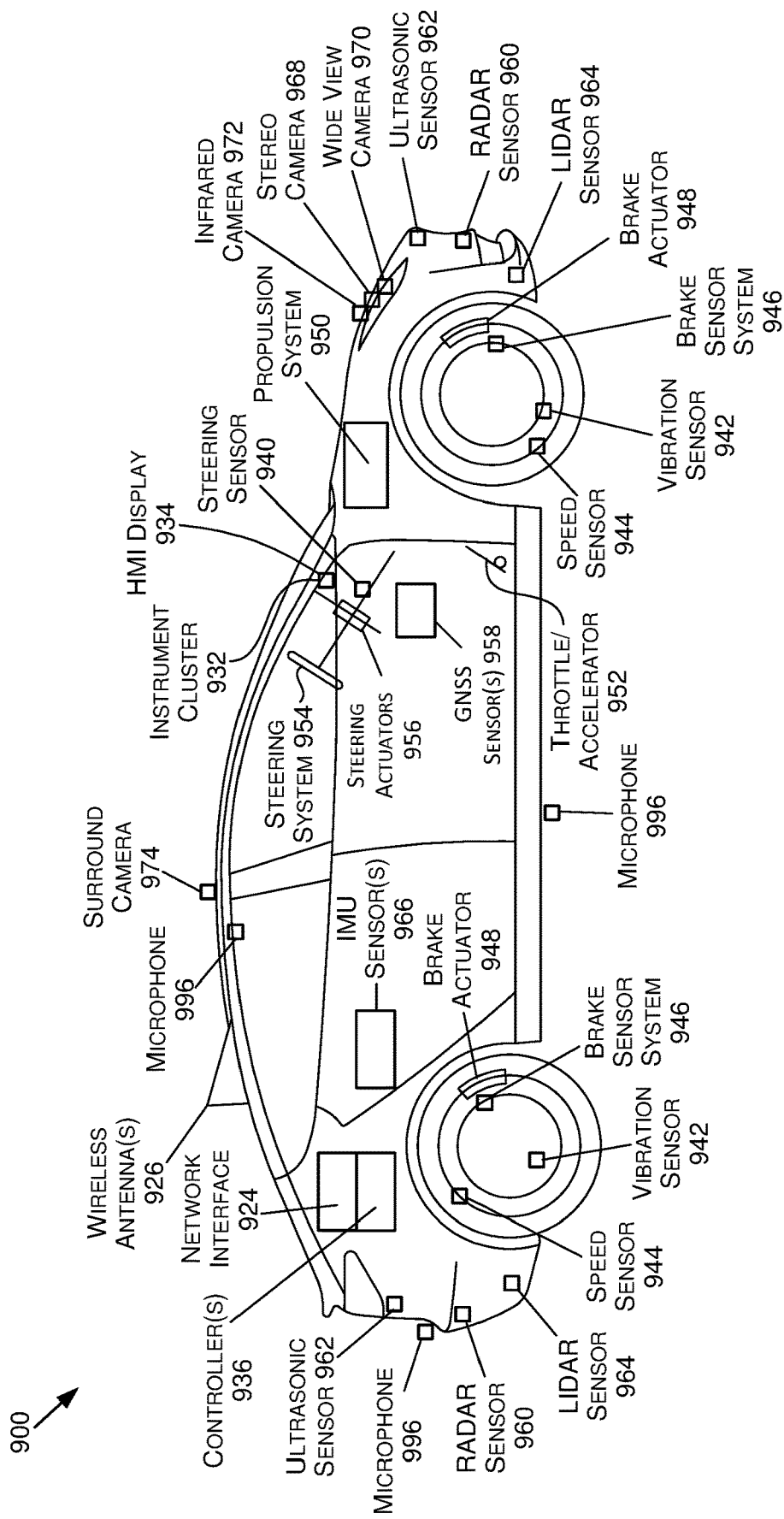
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. For example, the vehicle 900 may be capable of conditional automation (Level 3), high automation (Level 4), and/or full automation (Level 5), depending on the embodiment.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the HD map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over LTE, WCDMA, UMTS, GSM, CDMA2000, etc. The wireless antenna(s) 926 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 9B:
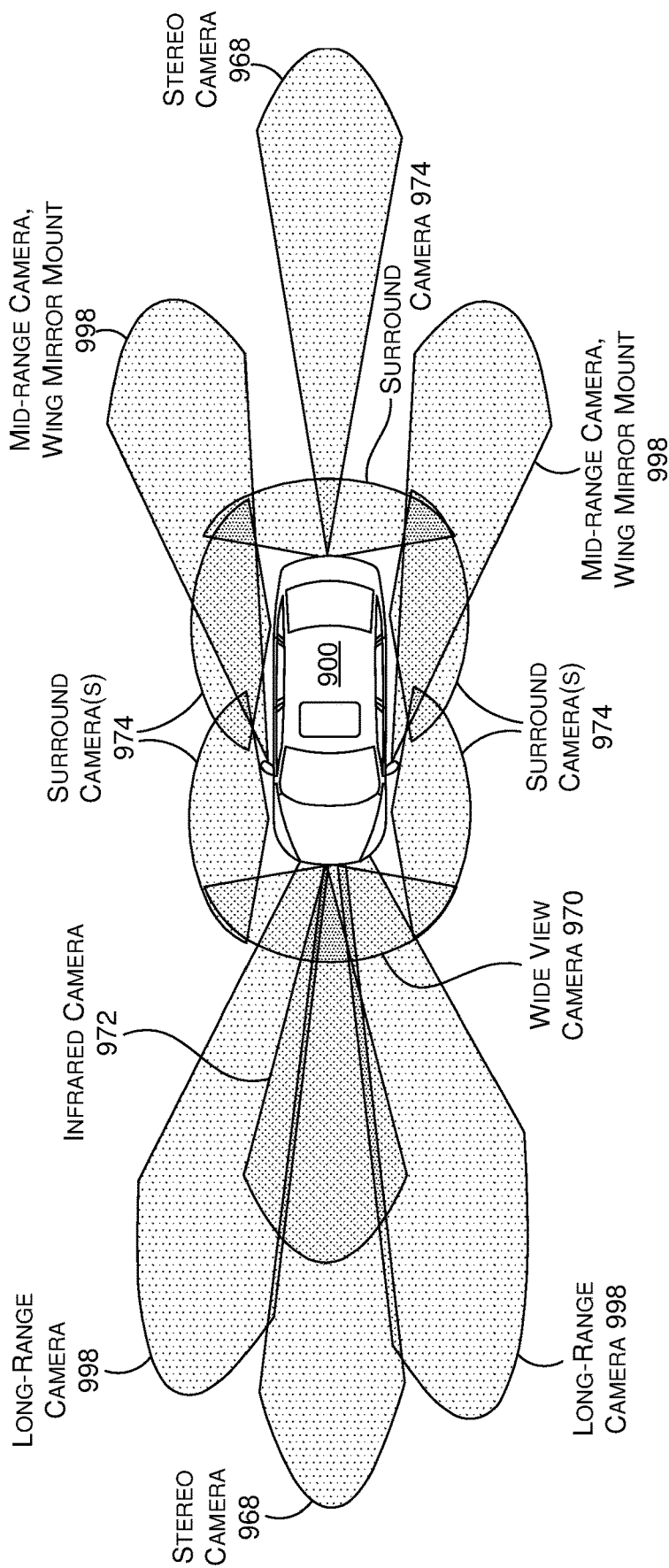
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 920 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may any number of wide-view cameras 970 on the vehicle 900. In addition, long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

One or more stereo cameras 968 may also be included in a front-facing configuration. The stereo camera(s) 968 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
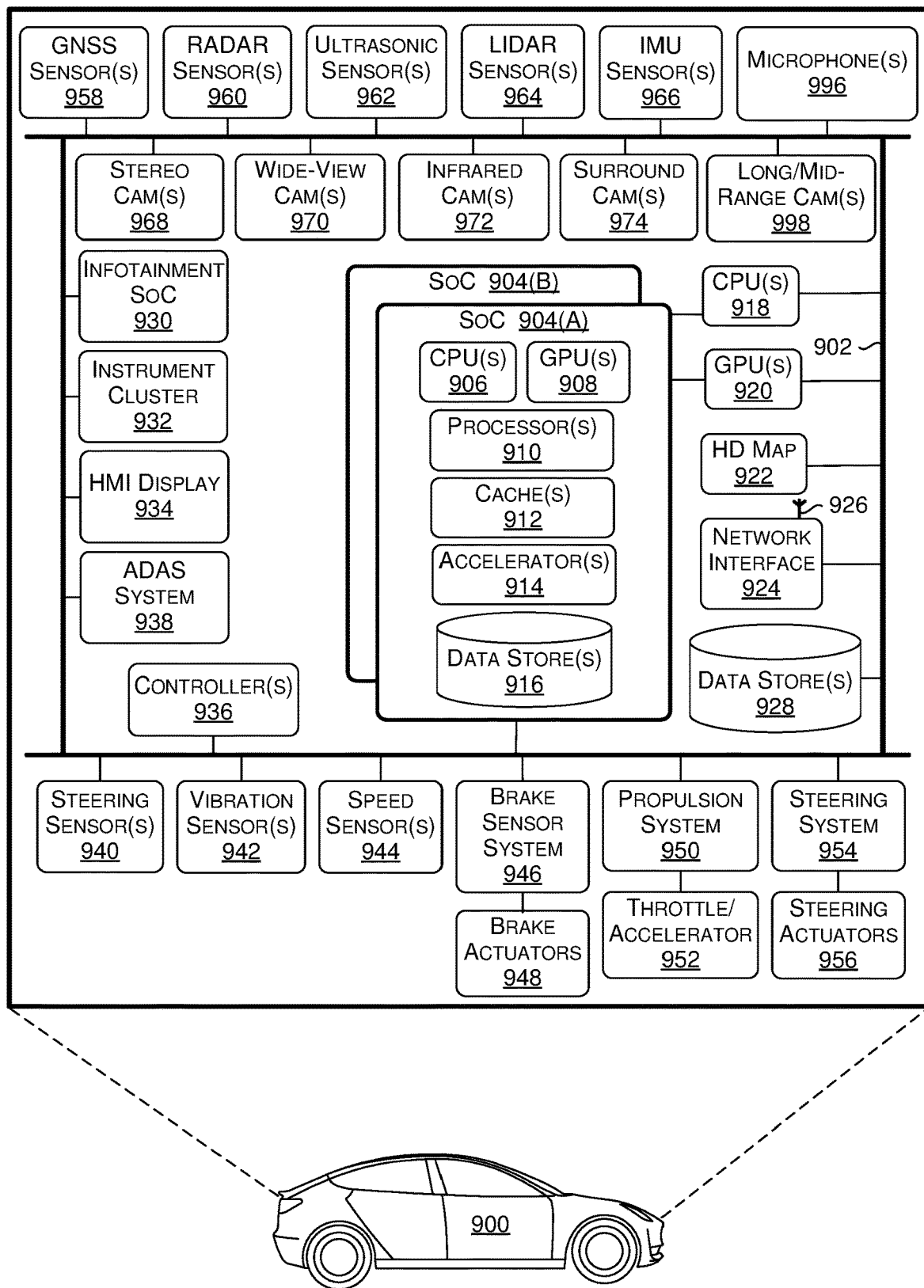
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing.

The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS and/or assisted GPS sensors), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 920-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
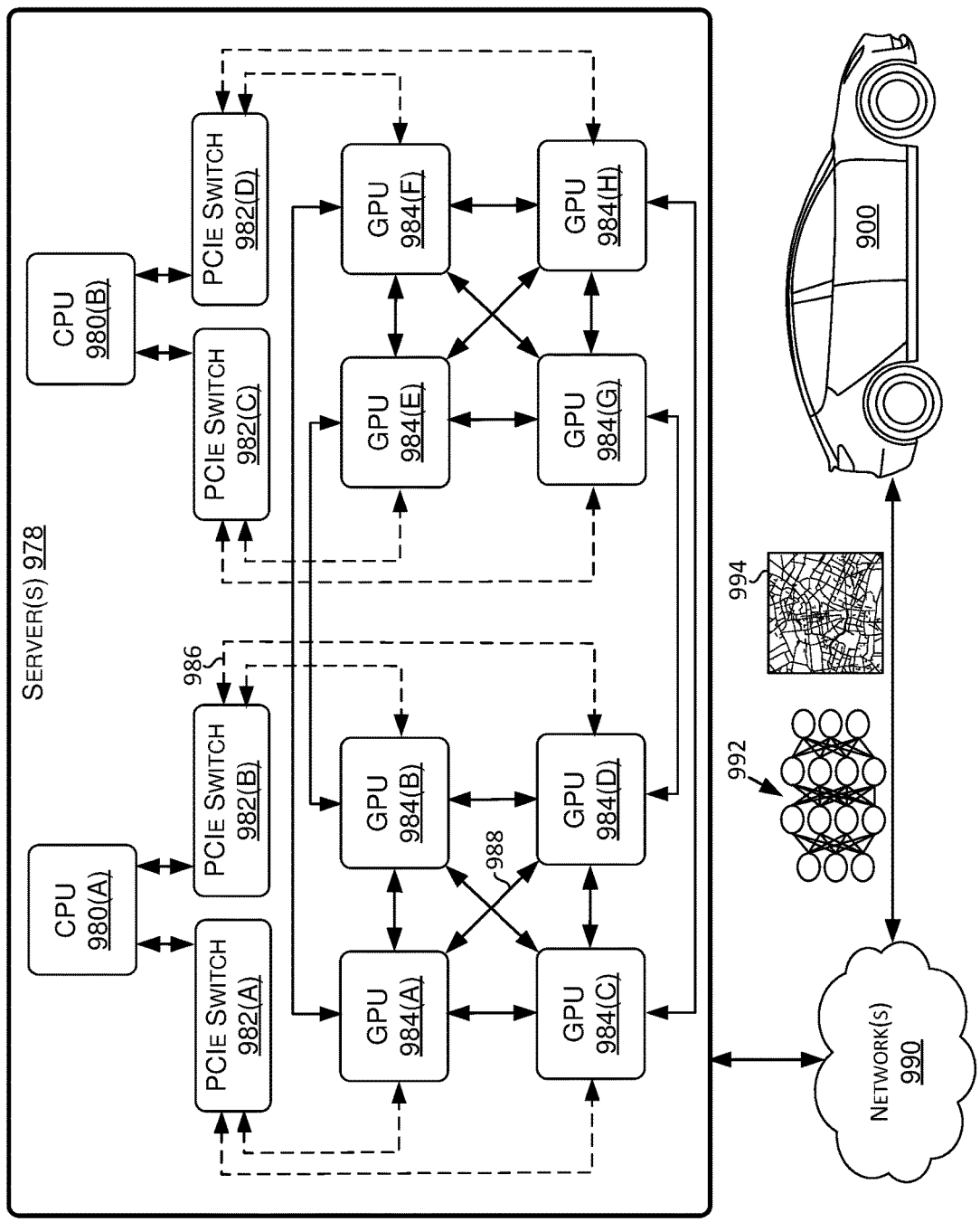
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
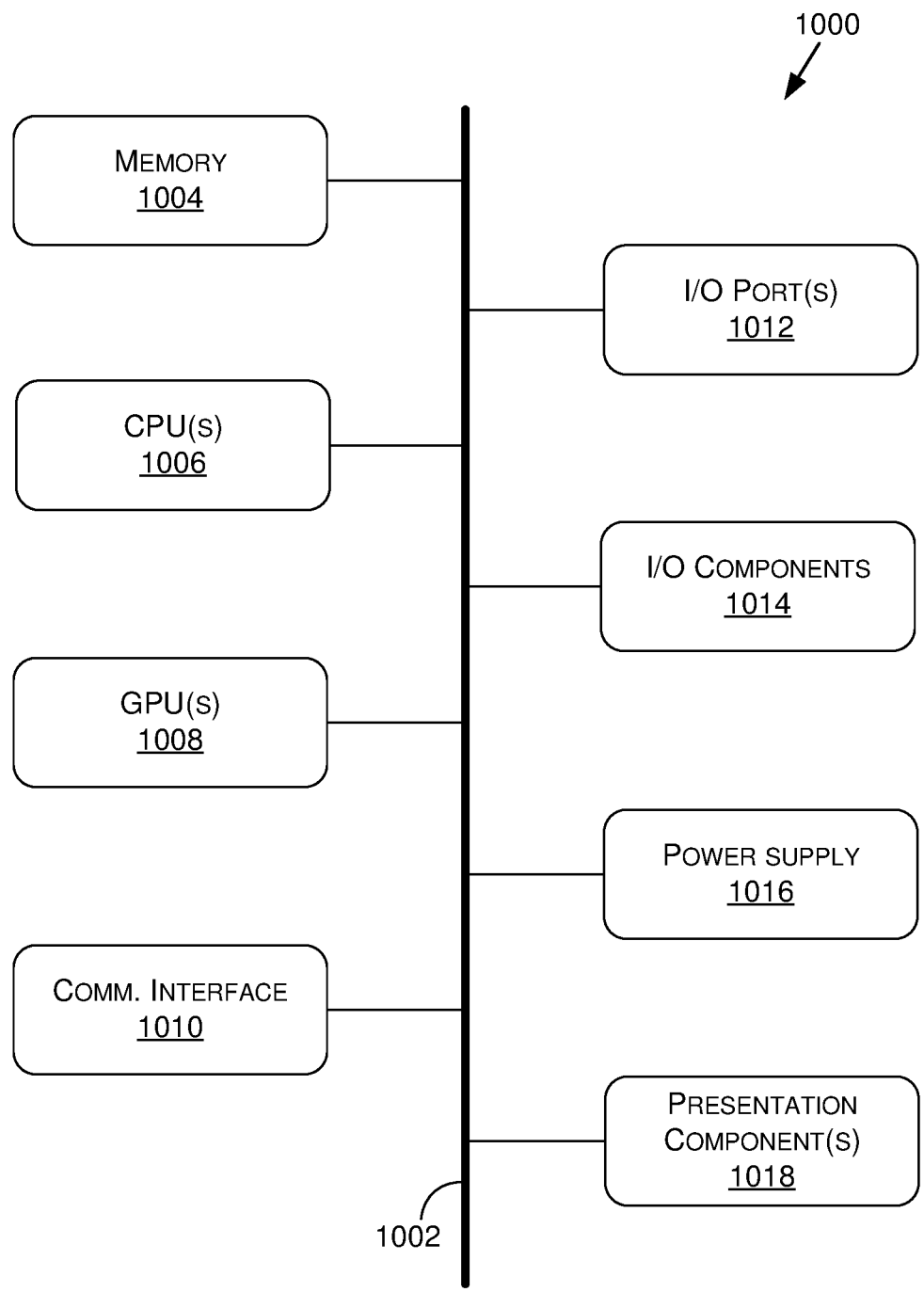
FIG. 10 is a block diagram of an example computing device suitable for use in implementing some embodiments of the present disclosure.

FIG. 10 is a block diagram of an example computing device 1000 suitable for use in implementing some embodiments of the present disclosure. Computing device 1000 may include a bus 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, and one or more presentation components 1018 (e.g., display(s)).

Although the various blocks of FIG. 10 are shown as connected via the bus 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The bus 1002 may represent one or more busses, such as an address bus, a data bus, a control bus, or a combination thereof. The bus 1002 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an ARM processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

The GPU(s) 1008 may be used by the computing device 1000 to render graphics (e.g., 3D graphics). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data. The display memory may be included as part of the memory 1004. The GPU(s) 708 may include two or more GPUs operating in parallel (e.g., via a link). When combined together, each GPU 1008 may generate pixel data for different portions of an output image or for different output images (e.g., a first GPU for a first image and a second GPU for a second image). Each GPU may include its own memory, or may share memory with other GPUs.

In examples where the computing device 1000 does not include the GPU(s) 1008, the CPU(s) 1006 may be used to render graphics.

The communication interface 1010 may include one or more receivers, transmitters, and/or transceivers that enable the computing device 700 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
   processing circuitry to perform one or more operations of a machine in an environment using a mask, the mask generated for a lane, at least in part, by:

obtaining image data generated using an image sensor, the image data representative of an image depicting a field-of-view of the image sensor;

determining that first points of the image are associated with a first polyline corresponding to the lane and second points of the image are associated with a second polyline corresponding to the lane;

connecting the first points to generate the first polyline and the second points to generate the second polyline;

based at least on the connecting the first points and the second points, connecting, in a crisscross pattern, the first points of the first polyline to the second points of the second polyline to generate a plurality of triangles; and generating a polygon corresponding to the lane.

2. The processor of claim 1, wherein the mask is generated using a triangulation algorithm.

3. The processor of claim 2, wherein the triangulation algorithm includes monotone polygon triangulation.

4. The processor of claim 1, wherein the determining that the first points of the image are associated with the first polyline and the second points of the image are associated with the second polyline uses one or more deep neural networks (DNNs) processing the image data.

5. The processor of claim 1, wherein the one or more operations include at least one of: assigning an object to a lane using the mask, determining a path or trajectory through at least a portion of the environment, performing obstacle avoidance, or updating a world model.

6. The processor of claim 1, the performing the one or more operations is further executed using an object fence corresponding to an object detected in the environment.

7. The processor of claim 1, wherein the one or more operations include assigning one or more objects to the lane represented by the mask.

8. A method comprising:
obtaining image data generated using an image sensor, the image data representative of an image;

determining, based at least on the image data, one or more first points of the image that are associated with a first polyline and one or more second points of the image that are associated with a second polyline;

connecting the one or more first points to the one or more second points to generate one or more triangles associated with the image;

determining one or more pixels of the image that are included in the one or more triangles;

generating a polygon that at least encloses the one or more pixels; and performing one or more operations using a machine and based at least on the polygon.

9. A system comprising:
one or more processors to:
obtain image data generated using an image sensor, the image data representative of an image depicting a field-of-view of the image sensor;

determine at least a first location within the image of a first polyline corresponding to a lane and a second location within the image of a second polyline corresponding to the lane;

connect one or more first points of the first polyline to one or more second points of the second polyline to generate one or more triangles associated with the image;

determine one or more pixels of the image that are included in the one or more triangles;

generate a polygon that at least encloses the one or more pixels; and perform one or more operations by a machine using the polygon.

10. The system of claim 9, wherein the one or more processors are further to generate at least a second portion of the polygon using a lane extension algorithm to extend the lane beyond a detected portion of the lane.

11. The system of claim 10, wherein the lane extension algorithm includes at least one of a curve fitting algorithm or a lane extrapolation algorithm.

12. The system of claim 9, wherein the one or more processors are further to generate a second polygon corresponding to a virtual lane.

13. The system of claim 9, wherein the performance of the one or more operations comprises:
comparing an object representation corresponding to an object to the polygon; and
determining, based at least on the comparing, to assign the object to the lane.

14. The system of claim 13, wherein the one or more processors are further to generate an object fence using a bounding shape corresponding to the object.

15. The system of claim 9, wherein the determination of the first location within the image of the first polyline and the second location within the image of the second polyline uses one or more deep neural networks (DNNs) processing the image data.

16. The system of claim 9, wherein the system is comprised in at least one of:
a control system for an autonomous or semi-autonomous machine;
a perception system for an autonomous or semi-autonomous machine;
a system for performing simulation operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

17. The system of claim 9, wherein the connection of the one or more first points of the first polyline to the one or more second points of the second polyline comprises:
connecting each of the one or more first points of the first polyline to at least a point from the one or more second points to generate one or more first triangles of the one or more triangles; and
connecting each of the one or more second points of the second polyline to at least a point from the one or more first points of the second polyline to generate one or more second triangles of the one or more triangles.

18. The method of claim 8, wherein the generating the polygon comprises:
determining the one or more pixels of the image that are included within the plurality of triangles; and
generating the polygon to enclose the one or more pixels.

19. The method of claim 8, wherein:
the one or more first points include a first plurality of points;
the one or more second points include a second plurality of points;
the method further comprises connecting the first plurality of points to generate the first polyline and the second plurality of points to generate the second polyline; and the connecting the plurality of first points and the plurality of second points to generate the one or more triangles occurs after the connecting the plurality of first points to generate the first polyline and the plurality of second points to generate the second polyline.

20. The method of claim 8, wherein the connecting the one or more first points to the one or more second points comprises:
connecting each of the one or more first points to at least a point from the one or more second points; and
connecting each of the one or more second points to at least a point from the one or more first points.

* * * * *